United States Patent
Brandt et al.

(10) Patent No.: US 12,528,282 B2
(45) Date of Patent: Jan. 20, 2026

(54) METHODS AND SYSTEMS FOR MANUFACTURING A COMPOSITE TEXTILE

(71) Applicant: NIKE, Inc., Beaverton, OR (US)

(72) Inventors: Baron C. Brandt, Portland, OR (US); Dallas Lund, Portland, OR (US); Andrea J. Staub, Portland, OR (US); Gaorong Wang, Sunnyvale, CA (US)

(73) Assignee: NIKE, Inc., Beaverton, OR (US)

( * ) Notice: Subject to any disclaimer, the term of this patent is extended or adjusted under 35 U.S.C. 154(b) by 96 days.

(21) Appl. No.: 18/640,989

(22) Filed: Apr. 19, 2024

(65) Prior Publication Data
US 2024/0351324 A1    Oct. 24, 2024

Related U.S. Application Data

(60) Provisional application No. 63/497,649, filed on Apr. 21, 2023.

(51) Int. Cl.
*B32B 38/00* (2006.01)
*B32B 37/20* (2006.01)
(Continued)

(52) U.S. Cl.
CPC .......... *B32B 38/0004* (2013.01); *B32B 37/20* (2013.01); *B32B 38/0012* (2013.01);
(Continued)

(58) Field of Classification Search
CPC . B32B 2305/28; B32B 2437/00; B32B 37/20; B32B 38/0004; B32B 38/0012; B32B 38/10; B32B 38/1858; D01G 11/00
See application file for complete search history.

(56) References Cited

U.S. PATENT DOCUMENTS

| | | |
|---|---|---|
| 4,350,727 A | 9/1982 | Wald et al. |
| 2019/0313719 A1 | 10/2019 | Jo et al. |
| 2024/0351324 A1* | 10/2024 | Brandt .................. B32B 37/20 |

FOREIGN PATENT DOCUMENTS

| | | |
|---|---|---|
| CN | 216533882 U | 5/2022 |
| WO | 2022/094184 A2 | 5/2022 |

OTHER PUBLICATIONS

International Search Report and Written Opinion received for PCT Patent Application No. PCT/US2024/025600, mailed on Sep. 11, 2024, 20 pages.
(Continued)

*Primary Examiner* — Sonya M Sengupta
(74) *Attorney, Agent, or Firm* — Shook, Hardy & Bacon L.L.P.

(57) ABSTRACT

This disclosure relates to a composite textile that can be sustainable, as well as methods and systems for constructing the composite textile and recollecting and harvesting excess material (e.g., remnants). In at least some examples, a first pattern piece is cut from a first material layer, and a second pattern piece is cut from a second material layer. In addition, the first pattern piece can be separated from the first material layer, which can leave a first remnant, and the second pattern piece can be separated from the second material layer, which can leave a second remnant. Once separated, the first pattern piece can be stacked atop the second pattern piece, and the stacked pattern pieces can be entangled to form a composite pattern piece. The remnant associated with the first material layer can be separated from the remnant associated with the second material layer and reused.

20 Claims, 6 Drawing Sheets

(51) Int. Cl.
*B32B 38/10* (2006.01)
*B32B 38/18* (2006.01)
*D01G 11/00* (2006.01)

(52) U.S. Cl.
CPC .......... *B32B 38/10* (2013.01); *B32B 38/1858* (2013.01); *D01G 11/00* (2013.01); *B32B 2305/28* (2013.01); *B32B 2437/00* (2013.01)

(56) References Cited

OTHER PUBLICATIONS

Invitation to Pay additional Fee for PCT Patent Application No. PCT/US2024/025600, mailed on Jul. 15, 2024, 12 pages.

\* cited by examiner

METHODS AND SYSTEMS FOR MANUFACTURING A COMPOSITE TEXTILE

CROSS-REFERENCE TO RELATED APPLICATIONS

This application claims the priority benefit of U.S. 63/497,649 (filed Apr. 21, 2023), which is hereby incorporated herein by reference in its entirety.

BACKGROUND

Constructing composite textiles (e.g., composite nonwoven textiles) sometimes includes stacking material layers (e.g., a fiber-web material layer and one or more other material layers) and then entangling the stacked material layers to form the composite textile. After the stack of material layers has been entangled to form the composite textile, one or more pattern pieces can be cut from the composite textile (e.g., according to patterns or templates), and the one or more pattern pieces can then be used to form an article (e.g., garment, footwear, bags, etc.). However, in some instances, collecting and reusing remnant (e.g., portions of the composite textile left over after the pattern pieces are cut) can present challenges. For example, the material layers can be difficult to separate. In addition, when the material layers are separated, the remnant associated with one material layer can include material (e.g., fibers) from another material layer, which can limit reusability.

DETAILED DESCRIPTION OF DRAWINGS

This disclosure is related to a composite textile and methods and systems for manufacturing the composite textile. Examples are described in detail below with reference to these figures.

Figure 5:
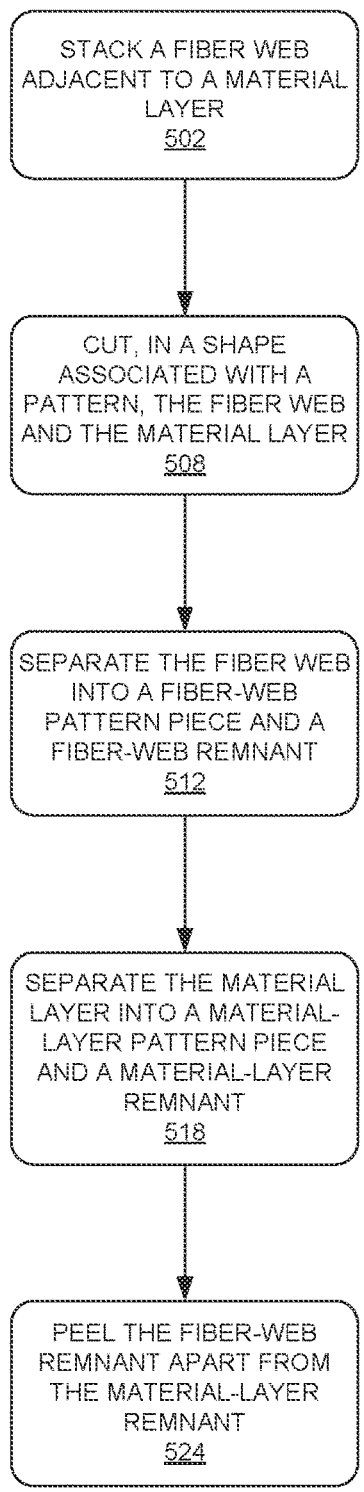
Figure 5:
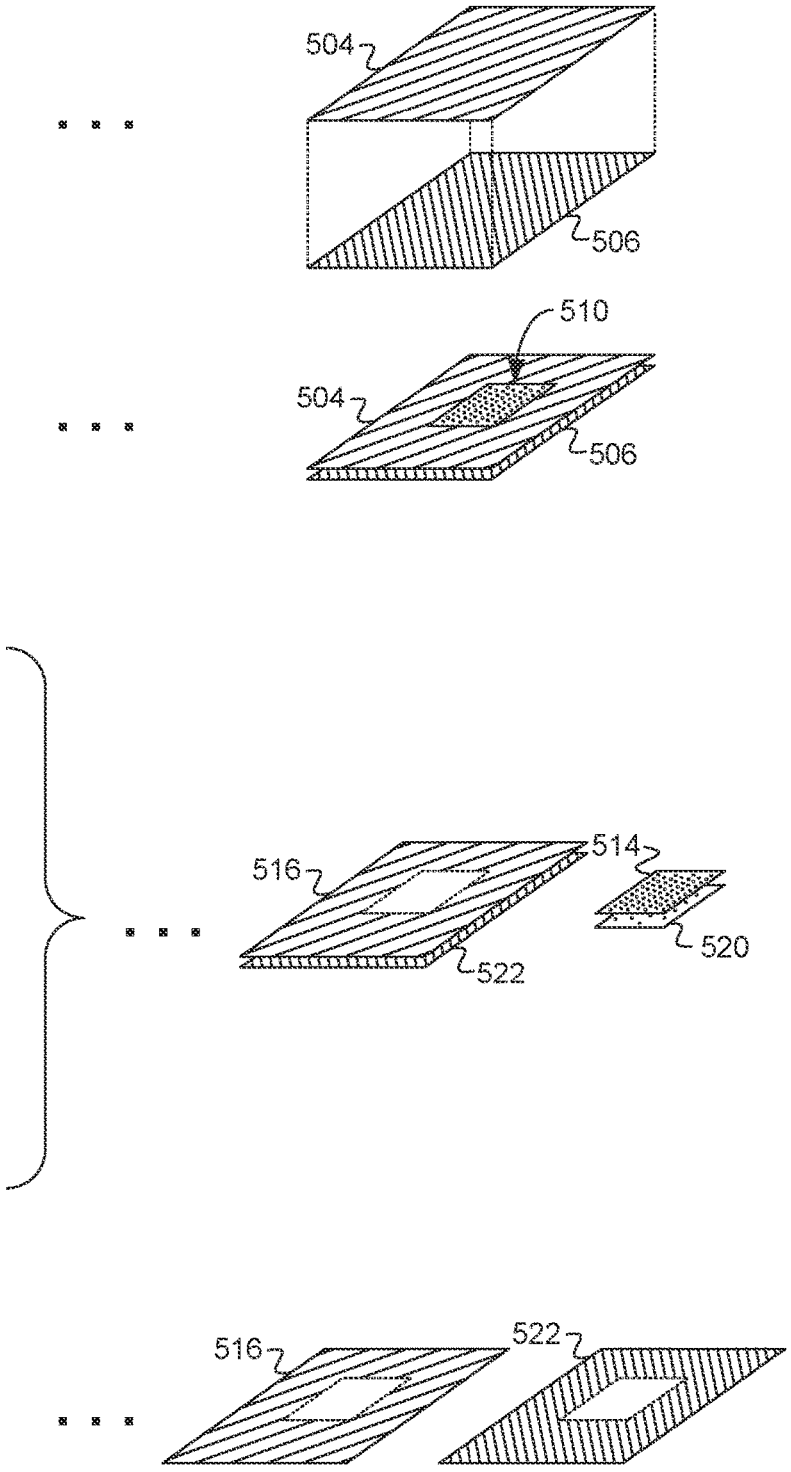

FIG. 5 includes a flow diagram depicting steps associated with a method of manufacturing a composite textile, in accordance with examples.

DETAILED DESCRIPTION

This detailed description is related to a composite textile and methods and systems for manufacturing the composite textile. At a high level, subject matter described herein is related to a composite textile that is sustainable, as well as methods and systems for constructing the composite textile and recollecting and harvesting excess material (e.g., remnants). In at least some examples, a first material layer (e.g., fiber web) is stacked atop a second material layer.

In some instances, after the material layers are stacked, a first pattern piece is cut from the first material layer, and a second pattern piece is cut from a second material layer (e.g., the pattern pieces can be simultaneously cut by cutting through the stack). In addition, the first pattern piece can be separated from the first material layer, which can leave a first remnant, and the second pattern piece can be separated from the second material layer, which can leave a second remnant.

Once separated from the remnants, the first pattern piece and the second pattern piece can remain stacked (e.g., as a multi-layer pattern piece), and the stacked pattern pieces can be entangled, entwined, or otherwise combined to form a composite pattern piece (e.g., by way of mechanical entanglement, thermal bonding such as via laser or heat press, etc.).

Furthermore, in some examples, the first material layer and the second material layer are not entangled or entwined (e.g., have not be subjected to mechanical entanglement, such as by needle entanglement processes, hydro-entanglement processes, or the like) when the first and second pattern pieces are cut and separated. As such, the remnant associated with the first material layer can be separated from (e.g., peeled apart from) the remnant associated with the second material layer, and the remnant (or portions of the remnant) can be reused (e.g., recycled, repurposed, shredded, cut again, re-pelletized, etc.).

In some examples, at least one of the material layers can include a nonwoven textile (e.g., a fiber web formed with staple fibers, spun-bonded, spunlace, melt-blown, etc.). In addition, both material layers can include a nonwoven textiles. In some instances, both material layers can include a nonwoven that is formed by the same type of process (e.g., both material layers are fiber webs formed with staple fibers, spun-bonded, spunlace, melt-blown, etc.). In some instances, the material layers can include respective nonwovens formed by different processes, such that one of the nonwoven material layers is formed with one of staple fibers, spun-bonded filaments, spunlace filaments, or melt-blown filaments, and the other nonwoven material layer is formed by a different one of staple fibers, spun-bonded filaments, spunlace filaments, or melt-blown filaments. In some examples, the material layers can include types of material layers other than nonwoven textiles, such as other knits, weaves, films, and the like. In some examples, the material layers can include a recyclable composite comprised of one or more different types of textile layers.

Conventional approaches associated with manufacturing composite textiles (e.g., composite nonwoven textiles) often include stacking and entangling a nonwoven layer (e.g., fiber web) with one or more other material layers. In some instances, the nonwoven layer and the one or more other material layers can include different properties. For example, the nonwoven layer can include a fiber web that is stacked and entangled with one or more other fiber webs, in which case the fiber web and the one or more other fiber webs can include various different respective properties. Different respective properties can include, among other things, different fiber properties (e.g., denier, diameter, length, chemical composition, color properties, structure, shape, etc.) and different fiber-web properties (e.g., basis weight, thickness, etc.). In addition, the fiber web (or fiber webs) can be stacked and entangled with one or more other types of material layers, such as other nonwovens (e.g., spun-bonded, melt-blown, etc.), films, webs, scrims, etc., which can also include various different respective properties. As indicated, the stacked material layers (e.g., fiber web with one or more other fiber webs and/or one or more other material layers) can be entangled to form a composite nonwoven textile, which can include properties resulting from a combination of the properties of the constituent material layers. Conventionally, after entanglement, pattern pieces can be cut from the composite nonwoven textile and then removed from the composite nonwoven textile for incorporation into a finished good (e.g., wearable article, bag, etc.). However, once the pattern pieces are removed from the composite nonwoven textile, it can be challenging to separate the fiber web from the other material layers. For example, due to the entangling, it can be challenging to physically separate the fiber web. In addition, if the fiber web is separated (e.g., pulled apart from) from the entangled stack, the fiber web can often include fibers, yarns, filament, or other material from the other layers that includes different properties, which can limit the usefulness of the fiber web for subsequent use. In some examples, the fiber web can be considered contaminated by the material from the other layers with different properties. In contrast to conventional approaches, subject matter of the present disclosure includes cutting pattern pieces from the fiber web before entanglement, which can allow remnants of the fiber web to be more easily separated from other stacked layers and can increase the usefulness of the remnants in later applications and/or for recycling.

As indicated above, examples of the present disclosure can include cutting pattern pieces from textiles (or textile layers) before the textiles are entangled, which can allow for the remnants to be more easily separated from one another for use in subsequent applications. In at least one example, the present disclosure can include, before cutting pattern pieces, layering or stacking a nonwoven textile (e.g., a fiber web, spunlace, spun-bonded, melt-blown, etc.) with one or more other material layers (e.g., one or more other nonwovens, knits, weaves, and/or films, etc.). For example, the nonwoven textile can include a fiber web that has been carded, lapped, and pre-needled and that has been rolled onto a core as a fiber-web roll good. In some examples, the nonwoven textile can include a homogeneous set of fibers (e.g., homogenous based on one or more of a type of fiber or a distribution of different fiber types).

In addition, the one or more other material layers (with which the fiber web is stacked) can also include a respective material roll good. In some examples, a length of the fiber-web roll good and a length of the one or more other material roll goods can be unrolled (e.g., paid out), and the unrolled portions can be stacked or layered (e.g., one atop the other).

In some examples, the fiber web and the one or more other material layers might not include a roll good, and instead can include other forms of material layers, such as material layer rectangles or other panel shapes that can be stacked and from which pattern pieces can be cut. The other material layers can be manually placed or automatedly stacked relative to the one or more other layers.

Subject matter of the present disclosure can include various approaches to material re-uptake (e.g., after stacking and cutting). In at least some examples, a portion of a nonwoven roll good (e.g., fiber-web roll good) that is unrolled from a first core can be affixed to a second core, which can operate to take up or re-roll the paid-out nonwoven textile (e.g., after the pattern piece is cut). For instance, an unrolled portion of the nonwoven roll good can be extended across a span, and the unrolled edge can be affixed to the second core. In addition, the second core can be affixed to a drive assembly that, with the unrolled edge attached, rotates the second core and unrolls the nonwoven roll good from the first core. The drive assembly can include, for example, a manual crank attached to the second core, an electric motor that turns the second core (e.g., via a belt), etc.

In examples, the portion of the nonwoven textile that is unrolled and extends between the core of the roll good (e.g., first core) and the second core can be stacked or layered with the one or more other material layers. The one or more other materials layers can, in some examples, also be unrolled and affixed to respective other cores, which can likewise operate to take up or re-roll the material layer (e.g., after the pattern piece is cut). For example, these other second cores can also be coupled to the drive assembly (or to a separate drive assembly). As such, the one or more other material layers can also include a portion that is unrolled, that extends between the core of the roll good (e.g., first core) and the other roller or core, and that can be stacked with the unrolled portion of the fiber web.

In at least some examples, once the nonwoven textile is stacked with one or more other material layers, a pattern can be cut into the stacked material layers. As such, multiple pattern pieces can generated at the same time (e.g., via the same cutting step). The pattern can be cut in various manners. For example, a cutting tool (e.g., knife, router, blade, die, laser, etc.) can simultaneously cut through the stacked material layers. In some examples, the cutting tool can be traversed along a pattern configured to generate a shape associated with a pattern piece (e.g., garment-front pattern piece, garment-back pattern piece, sleeve pattern piece, shoulder pattern piece, yoke pattern piece, footwear upper, etc.). In some examples, the cutting tool can include manual control. In some examples, the cutting tool can include automated control (e.g., computer numerical control).

In addition, the cutting tool can be associated with one or more other components. For example, the cutting tool can include a gantry that is positioned above the stacked material layers and that supports the cutting tool as the cutting tool traverses the pattern. In some examples, the cutting tool can include a laser (e.g., CO2 laser) associated with a scanner, which can be used to automatedly detect properties of the material layers and adjust the laser accordingly.

In some examples, a negatively pressurized air source (e.g., vacuum) can operate on the stacked material layers at or near a region in which the pattern pieces are cut. Among other things, the negatively pressurized air can help hold the stacked material layers in position while the pattern pieces are cut.

In some examples, after being cut, the multiple pattern pieces (e.g., the nonwoven pattern piece and one or more other pattern pieces associated with one or more other types of materials) can be separated from the stacked material layers. For example, the pattern pieces can fall (e.g., via gravity) from the stacked material layers.

In some examples, the stacked material layers can be traversed (e.g., pulled via rotation of the second cores) across a surface that urges the multiple pattern pieces from the stacked material layers, such that after the pattern pieces are removed, the stacked material layers include remnants. In some examples, the surface can be or include a stationary rod. In some examples, the surface can be or include a roller. In some examples, the surface can include a rotating punch that presses the multiple pattern pieces from the stacked material layers.

In some examples, when separated, the multiple pattern pieces can remain stacked, and the cut edges of the material layers can remain aligned. In addition, once the multiple pattern pieces are removed, the stacked layers can include the remnants, which can remain attached to the second cores that are configured to take up the post-cut remnants.

In at least some examples, after being separated from the stacked layers, the multiple pattern pieces (e.g., the nonwoven pattern piece and one or more other pattern pieces associated with one or more other types of materials) can be incorporated into a finished article. For example, as indicated, the multiple pattern pieces can remain stacked and aligned.

In some instances, the pattern pieces can undergo various processes for incorporation into a finished article. For example, the pattern pieces can be entangled, entwined, laminated, or otherwise combined with one another to include a composite-textile pattern piece. In some examples, the pattern pieces are mechanically entangled. In some examples, the pattern pieces are needle punched. In some examples, the pattern pieces are fluid entangled (e.g., via water or some other fluid medium). In some examples, the pattern pieces are laminated, such as by chemically bonding one layer to another layer. In some examples, the pattern pieces are heat bonded (e.g., via laser, heat press, etc.). In some examples, the pattern pieces are pressure bonded.

Further, some examples of the present disclosure can include processing the pattern pieces with multiple, successive combining operations. For example, in some instances, the pattern pieces can undergo an initial combining operation, which is configured to at least partially combine the pattern pieces (e.g., where "at least partially" can refer to combining at least a region of the pattern pieces, but not necessarily the entire abutting surfaces of the pattern pieces). The pattern pieces can be at least partially combined using various techniques. For example, the pattern pieces can be entangled, and particularly mechanically entangled (e.g., needled, fluid entangled, etc.) in one or more sub-regions of the pattern pieces. Additionally or alternatively, the pattern pieces can be welded, adhesively bonded, tacked, treated via laser, and/or otherwise combined in one or more sub-regions. Among other things, at least partially combining the pattern pieces can reduce the likelihood that the pattern pieces will become detached from one another and/or will become misaligned, such as in the interim between the pattern pieces being cut and eventually being incorporated into a finished good. As such, the at least partially combined pattern pieces can be transported, stored, other otherwise processed before undergoing additional operations (e.g., entanglement, lamination, surface treatments, printing, etc.) for incorporation into the finished good.

In some examples, after the stacked pattern pieces are removed from the stacked material layers, the remnants (e.g., the nonwoven roll good remnant and one or more other material remnants) at least partly are taken up (e.g., collected or re-rolled) via respective second cores. For example, as described above, the second cores can be associated with a drive assembly that directly or indirectly drives (particularly rotates) the second cores and winds the remnants around the second cores.

In addition, the second cores can be positioned (e.g., spaced) in a manner that peels the layers of the remnants apart from one another as the material layers are taken up. In some examples, the nonwoven material layer (e.g., fiber web) is not entangled or entwined (or is only minimally entangled or entwined) with the one or more other material layers when the pattern pieces are cut and separated. As such, the remnants associated with the nonwoven layer can be separated from (e.g., peeled apart from) the other material layers, such that the nonwoven layer and/or fibers, filaments, etc. included in the nonwoven layer can be reused (e.g., recycled, repurposed, shredded, cut again, re-pelletized, etc.).

In at least some examples, the nonwoven remnant can be at least partly reused in various manners (e.g., after being taken up by the second core). For instance, as mentioned above, the nonwoven roll good can include a homogenous set of fibers before being cut into a pattern piece. In examples of the present disclosure, the nonwoven remnant can also include the homogenous set of fibers (e.g., after the pattern piece is cut and the nonwoven remnant is separated from other material layers), since the nonwoven remnant was not previously entangled (or was only entangled by a small amount) with the other material layer(s) and the nonwoven remnant can be peeled apart from the one or more other material layers. As such, as compared with other techniques in which separating the nonwoven remnant is more challenging (e.g., due to a higher degree of entanglement), a nonwoven remnant of the subject disclosure can include (e.g., provide) a homogenous set of fibers (e.g., a higher percentage of the homogenous set of fibers) for subsequent use(s). Among other things, the homogenous set of fibers can be cut again into additional pattern pieces, shredded, re-pelletized, etc. In some examples, the homogenous set of fibers can include a set of fibers that include a threshold percentage (e.g., by weight) of a desired set of fiber types. In some examples, the threshold percentage is based on industry standards for tolerance associated with variance among a set of fibers. In some examples, the threshold is about 90% or greater. In some examples, the threshold is about 95% or greater.

As used herein, the term "article of apparel" is intended to encompass articles worn by a wearer, which can also be referred to as "wearable articles". Wearable articles can include, among other things, upper-body garments (e.g., tops, t-shirts, pullovers, hoodies, jackets, coats, vests, and the like), lower-body garments (e.g., pants, shorts, tights, capris, unitards, and the like), hats, gloves, sleeves (e.g., arm sleeves, calf sleeves), articles of footwear (e.g., uppers for shoes), and the like. As used herein, the term "finished goods" may include articles of apparel or wearable articles, equipment such as bags, furniture, and other such items. As used herein, the term "roll goods" may include, for example, rolls of textile, scraps or remnants remaining after pieces are cut from rolls, and the like.

The term "inner-facing surface" when referring to the wearable article means the surface that is configured to face mostly towards a body surface of a wearer, and the term "outer-facing surface" means the surface that is configured to substantially face away from the body surface of the wearer and toward an external environment. The term "innermost-facing surface" means the surface closest to the body surface of the wearer with respect to other layers of the wearable article, and the term "outermost-facing surface" means the surface that is positioned furthest away from the body surface of the wearer with respect to the other layers of the wearable article.

As used herein, the term "nonwoven textile" refers to a textile having fibers that are held together by mechanical and/or chemical interactions without being in the form of a knit, woven, braided construction, or other structured construction. In a particular aspect, the nonwoven textile includes a collection of fibers that are mechanically manipulated to form a mat-like material. Stated differently nonwoven textiles are directly made from fibers. The nonwoven textile may include different webs of fibers formed into a cohesive structure, where the different webs of fibers may have a different or similar composition of fibers and/or different properties.

Non-limiting examples of nonwoven textiles can include staple-fiber nonwovens (e.g., formed by carding and needle entanglement or fluid entanglement), spunbond nonwovens, spunlace nonwovens, and melt-blown nonwovens. Stated differently, bonding of the fibers in the nonwoven textile can be achieved with thermal bonding (with or without calendering), hydro-entanglement, ultrasonic bonding, needlepunching (needle felting), chemical bonding (e.g., using binders such as latex emulsions or solution polymers or binder fibers or powders), meltblown bonding (e.g., fiber is bonded as air attenuated fibers intertangle during simultaneous fiber and web formation), spun-bond, and any combination thereof.

The term "web of fibers" or "fiber web" refers to a layer of fibers prior to undergoing a mechanical entanglement process with one or more other webs of fibers. The web of fibers includes fibers that have undergone a carding and lapping process that generally aligns the fibers in one or more common directions that extend along an x, y plane and that achieves a desired basis weight. The web of fibers may also undergo a light needling process or mechanical entanglement process that entangles the fibers of the web to a degree such that the web of fibers forms a cohesive structure that can be manipulated (e.g., rolled on to a roller, un-rolled from the roller, stacked, and the like). In examples, a "fiber-web roll good" refers to fibers that have been formed into a cohesive structure (e.g., by carding, lapping, and/or light needling) and rolled onto a core. The web of fibers may also undergo one or more additional processing steps such as printing prior to being entangled with other webs of fibers to form the composite nonwoven textile. The term "entangled web of fibers" when referring to the composite nonwoven textile refers to a web of fibers after it has undergone mechanical entanglement (e.g., needled, water entangled, air entangled, etc.) with one or more other webs of fibers. As such, a web of entangled fibers may include fibers originally present in the web of fibers forming the layer as well as fibers that are present in other webs of fibers that have been moved through the entanglement process into the web of entangled fibers.

Mechanical entanglement processes contemplated herein can include needle entanglement (commonly known as needlepunching) using barbed or structured needles (e.g., forked needles), and/or fluid entanglement. In aspects contemplated herein, needlepunching may be utilized based on the small denier of the fibers being used and the ability to fine tune different parameters associated with the needlepunching process. Needlepunching generally uses barbed or spiked needles to reposition a percentage of fibers from a generally horizontal orientation (an orientation extending along an x, y plane) to a generally vertical orientation (a z-direction orientation). Referring to the needlepunching process in general, the carded, lapped, and pre-needled webs may be stacked with other carded, lapped, and pre-needled webs and other layers such as an elastomeric layer and passed between a bed plate and a stripper plate positioned on opposing sides of the stacked web configuration.

Barbed needles, which are fixed to a needle board, pass in and out through the stacked web configuration, and the stripper plate strips the fibers from the needles after the needles have moved in and out of the stacked web configuration. The distance between the stripper plate and the bed plate may be adjusted to control web compression during needling. The needle board repeatedly engages and disengages from the stacked web configuration as the stacked web configuration is moved in a machine direction along a conveyance system such that the length of the stacked web configuration is needled.

Aspects herein contemplate using multiple needle boards sequentially positioned at different points along the conveyance system where different needle boards may engage the stacked web configuration from different faces of the stacked web configuration (e.g., an upper face and a lower face) as the stacked web configuration moves in the machine direction. Each engagement of a needle board with the stacked web configuration is known herein as a "pass."

Parameters associated with particular needle boards may be adjusted to achieve desired properties of the resulting needled nonwoven textile (e.g., basis weight, thickness, and the like). The different parameters may include stitch density (SD) which is the number of needles per $cm^2$ ($n/cm^2$) used during an entanglement pass and penetration depth (PD) which is how far the needle passes through the stacked web configuration before being pulled out of the stacked web configuration. Parameters associated with the needlepunching process in general may also be adjusted such as the spacing between the bed plate and the stripper plate and/or the speed of conveyance of the stacked web configuration.

Examples of this disclosure contemplate using a barbed needle (a needle having a pre-set number of barbs arranged along a length of the needle) although other needle types are contemplated herein. The barbs on the needle "capture" fibers as the barb moves from a first face to an opposing second face of the stacked web configuration. The movement of the needle through the stacked web configuration effectively moves or pushes fibers captured by the barbs from a location near or at the first face to a location near or at the second face and further causes physical interactions with other fibers helping to "lock" the moved fibers into place through, for example, friction.

It is also contemplated herein that the needles may pass through the stacked web configuration from the second face toward the first face. In example aspects, the number of barbs on the needle that interact with fibers may be based on the penetration depth of the needle. For example, all the barbs may interact with fibers when the penetration depth is a first amount, and fewer than all the barbs may interact with fibers as the penetration depth decreases.

In further example aspects, the size of the barb may be adjusted based on the denier of fibers used in the web(s). For example, the barb size may be selected so as to engage with small denier (e.g. fine) fibers but not with large denier fibers so as to cause selective movement of the small denier fibers but not the large denier fibers. In another example, the barb size may be selected so as to engage with both small denier and large denier fibers so as to cause movements of both fibers through the webs.

After entanglement, the nonwoven textile may include a first face and an opposite second face which both face outward with respect to an interior of the nonwoven textile and comprise the outermost faces of the nonwoven textile. As such, when viewing the nonwoven textile, the first face and the second face are each fully visible. The first face and the second face may both extend along x, y planes that are generally parallel and offset from each other. For instance, the first face may be oriented in a first x, y plane and the second face may be oriented in a second x, y plane generally parallel to and offset from the first x, y plane.

The term "elastomeric layer" as used herein refers to a layer that has stretch and recovery properties (e.g., is elastically resilient) in at least one orientational axis, which includes both a layer having stretch and recovery in a single orientational axis and a layer having stretch and recovery in multiple orientational axes. Examples of an orientational axis include a length direction, a width direction, an x-direction, a y-direction, and any direction angularly offset from a length direction, a width direction, an x-direction, and a y-direction.

The elastomeric layer may be formed from thermoplastic elastomers such as thermoplastic polyurethane (TPU), thermoplastic polyether ester elastomer (TPEE), combinations of TPU and TPEE and the like. The elastomeric layer may comprise a spunbond layer, a meltblown layer, a film, a web, a scrim, and the like. In example aspects, the elastomeric layer may include a spunbond TPEE or a meltblown TPU. Nonwoven elastomeric materials such as a spunbond TPEE or a meltblown TPU allow for lower basis weights than elastomeric films. As well, they are generally more breathable and permeable due to the fibrous nature of the web versus a film, and they are generally more pliable (e.g., less stiff) than films. These factors (low basis weight, breathable and permeable, pliable) make them ideal for use in the example composite nonwoven textile described herein especially in the apparel context where these are desirable features.

When referring to fibers, the term denier or denier per fiber is a unit of measure for the linear mass density of the fiber and more particularly, it is the mass in grams per 9000 meters of the fiber. In one example aspect, the denier of a fiber may be measured using ASTM D1577-07. The diameter of a fiber may be calculated based on the fiber's denier and the fiber's density, and in general, the diameter of a fiber has a direct correlation to the denier of the fiber (i.e., a smaller denier fiber has a smaller diameter).

As used in this disclosure the terms "filament," "fiber," or "fibers" refer to materials or structures that are in the form of discrete elongated pieces that are significantly longer than they are wide. A fiber can include natural, manmade or synthetic fibers. The fibers may be produced by conventional techniques, such as extrusion, electrospinning, interfacial polymerization, pulling, and the like.

Fibers can include carbon fibers, boron fibers, silicon carbide fibers, titania fibers, alumina fibers, quartz fibers, glass fibers, such as E, A, C, ECR, R, S, D, and NE glasses and quartz, or the like. The fibers can be fibers formed from synthetic polymers capable of forming fibers such as poly (ether ketone), polyimide, polybenzoxazole, poly (phenylene sulfide), polyesters (e.g., polyethylene terephthalate (PET)), polyolefins (e.g., polyethylene, polypropylene), aromatic polyamides (e.g., an aramid polymer such as para-aramid fibers and meta-aramid fibers), aromatic polyimides, polybenzimidazoles, polyetherimides, polytetrafluoroethylene, acrylic, modacrylic, poly (vinyl alcohol), polyamides, polyurethanes, and copolymers such as polyether-polyurea copolymers, polyester-polyurethanes, polyether block amide copolymers, or the like. The fibers can be natural fibers (e.g., silk, wool, cashmere, vicuna, cotton, flax, hemp, jute, sisal). The fibers can be man-made fibers from regenerated natural polymers, such as rayon, lyocell, acetate, triacetate, rubber, and poly (lactic acid).

The fibers may include virgin fibers (fibers that have not been recycled), and/or recycled fibers. Recycled fibers include "shredded-article fibers" and "re-pelletized-polymer fibers." As used herein, shredded-article fibers include fibers that are direct by-products of shredding a fiber-containing article (e.g., knit, woven, nonwoven, etc.). In some examples, shredded-article fibers may be derived without pelletizing and extrusion through processes that consume less energy, and as such, textiles that incorporate shredded-article fibers may have a lower carbon footprint. Re-pelletized-polymer fibers include fibers that are extruded from pelletized or chipped by-products derived from polymer-containing sources (e.g., polymer-containing bottles or containers; polymer-fiber articles that are knit, woven, nonwoven; roll goods; textile manufacturing scrap; fiber webs at various stages of carding, lapping, pre-needling, and needling; etc.).

Fibers can have an indefinite length. For example, man-made and synthetic fibers are generally extruded in substantially continuous strands. Alternatively, the fibers can be staple fibers, such as, for example, cotton fibers or extruded synthetic polymer fibers can be cut to form staple fibers of relatively uniform length. The staple fiber can have a have a length of about 1 millimeter to 100 centimeters or more as well as any increment therein (e.g., 1 millimeter increments). In some examples, the length is between 30 mm and 60 mm. In some examples, the length is about 38 mm. In some examples, the length is about 51 mm.

A fiber can have any of a variety of cross-sectional shapes. Natural fibers can have a natural cross-section, or can have a modified cross-sectional shape (e.g., with processes such as mercerization). Man-made or synthetic fibers can be extruded to provide a strand having a predetermined cross-sectional shape. The cross-sectional shape of a fiber can affect its properties, such as its softness, luster, and wicking ability. The fibers can have round or essentially round cross sections. Alternatively, the fibers can have non-round cross sections, such as flat, oval, octagonal, rectangular, wedge-shaped, triangular, dog-bone, multi-lobal, multi channel, hollow, core-shell, or other shapes.

A fiber can be a multi-component fiber, such as one comprising two or more co-extruded polymeric materials. The two or more co-extruded polymeric materials can be extruded in a core sheath, islands-in-the-sea, segmented-pie, striped, or side-by-side configuration. A multi-component fiber can be processed in order to form a plurality of smaller fibers (e.g., microfibers) from a single fiber, for example, by remove a sacrificial material.

As used herein, the term "yarn" refers to an assembly formed of one or more fibers, wherein the strand has a substantial length and a relatively small cross-section, and is suitable for use in the production of textiles by hand or by machine, including textiles made using weaving, knitting, crocheting, braiding, sewing, embroidery, or ropemaking techniques. Thread is a type of yarn commonly used for sewing.

Fibers and/or yarns can be manipulated in various manners to construct a textile, such as through knitting, weaving, braiding, and nonwoven techniques. As used herein, a textile or textile layer can include knits, wovens, nonwovens, braides, and films (e.g., extruded films).

The term "silicone-coated fiber" as used herein may mean a fiber having a continuous silicone coating such that the silicone coating completely covers the fiber along its length. In one example, the fiber may form a core and the silicone may form a sheath surrounding the core. In other example aspects, the term "silicone-coated fiber" may mean a fiber that has an intermittent coating of silicone in at least some areas along the length of the fiber. For instance, the fiber may be sprayed with a silicone coating. In this aspect, if a particular web of fibers includes 100% by weight of silicone-coated fibers, it is contemplated herein that the fibers that form the web may have areas that do not include the silicone coating. It is contemplated herein that the silicone-coated fibers are incorporated into the webs of fibers that form the composite nonwoven textile. Said differently, the silicone coating on the fibers is not applied to the fibers after the composite nonwoven textile is formed using, for example, a silicone spray finish.

The term "color" or "color property" as used herein when referring to the nonwoven textile generally refers to an observable color of fibers that form the textile. Such aspects contemplate that a color may be any color that may be afforded to fibers using dyes, pigments, and/or colorants that are known in the art. As such, fibers may be configured to have a color including, but not limited to red, orange, yellow, green, blue, indigo, violet, white, black, and shades thereof. In one example aspect, the color may be imparted to the fiber when the fiber is formed (commonly known as dope dyeing). In dope dyeing, the color is added to the fiber as it is being extruded such that the color is integral to the fiber and is not added to the fiber in a post-formation step (e.g., through a piece dyeing step).

Aspects related to a color further contemplate determining if one color is different from another color. In these aspects, a color may comprise a numerical color value, which may be determined by using instruments that objectively measure and/or calculate color values of a color of an object by standardizing and/or quantifying factors that may affect a perception of a color. Such instruments include, but are not limited to spectroradiometers, spectrophotometers, and the like. Thus, aspects herein contemplate that a "color" of a textile provided by fibers may comprise a numerical color value that is measured and/or calculated using spectroradiometers and/or spectrophotometers. Moreover, numerical color values may be associated with a color space or color model, which is a specific organization of colors that provides color representations for numerical color values, and thus, each numerical color value corresponds to a singular color represented in the color space or color model.

In these aspects, a color may be determined to be different from another color if a numerical color value of each color differs. Such a determination may be made by measuring and/or calculating a numerical color value of, for instance, a first textile having a first color with a spectroradiometer or a spectrophotometer, measuring and/or calculating a numerical color value of a second textile having a second color with the same instrument (i.e., if a spectrophotometer was used to measure the numerical color value of the first color, then a spectrophotometer is used to measure the numerical color value of the second color), and comparing the numerical color value of the first color with the numerical color value of the second color.

In another example, the determination may be made by measuring and/or calculating a numerical color value of a first area of a textile with a spectroradiometer or a spectrophotometer, measuring and/or calculating a numerical color value of a second area of the textile having a second color with the same instrument, and comparing the numerical color value of the first color with the numerical color value of the second color. If the numerical color values are not equal, then the first color or the first color property is different than the second color or the second color property, and vice versa.

Further, it is also contemplated that a visual distinction between two colors may correlate with a percentage difference between the numerical color values of the first color and the second color, and the visual distinction will be greater as the percentage difference between the color values increases. Moreover, a visual distinction may be based on a comparison between colors representations of the color values in a color space or model. For instance, when a first color has a numerical color value that corresponds to a represented color that is black or navy and a second color has a numerical color value that corresponds to a represented color that is red or yellow, a visual distinction between the first color and the second color is greater than a visual distinction between a first color with a represented color that is red and a second color with a represented color that is yellow.

The term "homogeneous," as used herein, can describe a fiber and can describe a set of fibers and refers to the quality of having relatively uniform properties. The term "homogeneity" refers to the degree to which a fiber or a set of fibers is homogeneous. Homogeneity can be used to describe a fiber or a fiber web at various stages of processing (e.g., entanglement), such as when the fiber or fiber webs are carded, lapped, pre-needled, entangled with other fiber webs, in a composite nonwoven textile, in a multi-layer pattern piece, in a fiber-web remnant, shredded, re-extruded, and the like. Homogeneity can be based on one or more properties, such as fiber length, denier, diameter, color properties, and chemical composition. Homogeneity can be measured in various manners. In one example, homogeneity can be based on measurements applied to a single fiber. In one example, homogeneity can be based on a unit area of a fiber web, which can be defined as 1 cm×1 cm (1 cm$^2$).

The term "unit area" can describe a portion of a textile used to assess properties of the textile. In some examples, a unit area can include a 1 cm×1 cm (1 cm$^2$), although other sizes can be used, as necessary or dictated based on the property to be assessed. In some examples, a "unit volume" can be used to assess properties of a textile, and a unit volume can include a 1 cm×1 cm×n, where n is a depth or thickness associated with the textile. In some examples, n is the entire thickness of the textile or is the thickness of a layer within the textile (e.g., the thickness of a fiber web within the textile). Other dimensions of unit volumes can also be used, as necessary or dictated based on the property to be assessed.

Homogeneity can be measured in various manners, which can depend on what property is being measured. For example, homogeneity can be determined by analyzing the fibers within a unit area to measure one or more properties (e.g., denier, diameter, length, color property, chemical composition, etc.) of the fibers and determining what percentage of fibers include a common property. In some examples, material composition can be based on one or more various known methods of chemical analysis, and homogeneity can be based on what percentage of material within a unit area includes a common chemical composition. Color property can be determined as described in other parts of this disclosure.

In at least some examples, homogeneity (e.g., a degree or relative amount of homogeneity) can be determined based on an average measured parameter in n number of regions of interest (ROI) having a standard deviation equal to, or less than, "X" units of the average value. In some examples, a property can be considered homogenous when the standard deviation is 5.0 or less and can be considered highly homogenous when the standard deviation is 1.0 or less. In at least some examples, n can be at least three or more.

For example, if within a textile (e.g., fiber web, composite nonwoven textile, etc.) four ROIs have a basis weight of 84, 87, 87, and 88, then the average basis weight is 86.5 and the standard deviation is 1.73. In examples, in which homogenous is based on a standard deviation of 5.0 or less, the textile can be deemed homogenous based on basis weight. If the basis weights were 84, 85, 85, and 86, then the average basis weight would be 85, the standard deviation would be 0.82, and where a standard deviation of 1.0 or less indicates highly homogenous, then the textile could be deemed highly homogenous with respect to basis weight.

The term "pill" or "pilling" as used herein refers to the formation of small balls of fibers or fibers ends on a facing side of the nonwoven textile. The pill may extend away from a surface plane of the face. Pills are generally formed during normal wash and wear due to forces (e.g., abrasion forces) that cause the fiber ends to migrate through the face of the nonwoven textile and entangle with other fiber ends. A textile's resistance to pilling may be measured using standardized tests such as Random Tumble and Martindale Pilling tests. The term "pile" as used herein generally refers to a raised surface or nap of a textile consisting of upright loops and/or terminal ends of fibers that extend from a face of the textile in a common direction.

Various measurements are provided herein with respect to the pre-entangled webs and the resulting composite nonwoven textile. Thickness of the resulting composite nonwoven may be measured using a precision thickness gauge. To measure thickness, for example, the textile may be positioned on a flat anvil and a pressure foot is pressed on to it from the upper surface under a standard fixed load. A dial indicator on the precision thickness gauge gives an indication of the thickness in mm. Basis weight is measured using ISO3801 testing standard and has the units grams per square meter (gsm). Textile stiffness, which generally corresponds to drape is measured using ASTMD4032 (2008) testing standard and has the units kilogram force (Kgf). Fabric growth and recovery is measured using ASTM2594 testing standard and is expressed as a percentage.

The term "stretch" as used herein means a textile characteristic measured as an increase of a specified distance under a prescribed tension and is generally expressed as a percentage of the original benchmark distance (i.e., the resting length or width). The term "growth" as used herein means an increase in distance of a specified benchmark (i.e., the resting length or width) after extension to a prescribed tension for a time interval followed by the release of tension and is usually expressed as a percentage of the original benchmark distance. "Recovery" as used herein means the ability of a textile to return to its original benchmark distance (i.e., its resting length or width) and is expressed as a percentage of the original benchmark distance. Thermal resistance, which generally corresponds to insulation features, is measured using ISO11092 testing standard and has the units of RCT ($M^2 *K/W$).

Unless otherwise noted, all measurements provided herein are measured at standard ambient temperature and pressure (25 degrees Celsius or 298.15 K and 1 bar) with the nonwoven textile in a resting (un-stretched) state.

As used herein, the term "about" means generally within ±10% of an indicated value unless indicated otherwise.

Figure 1A:
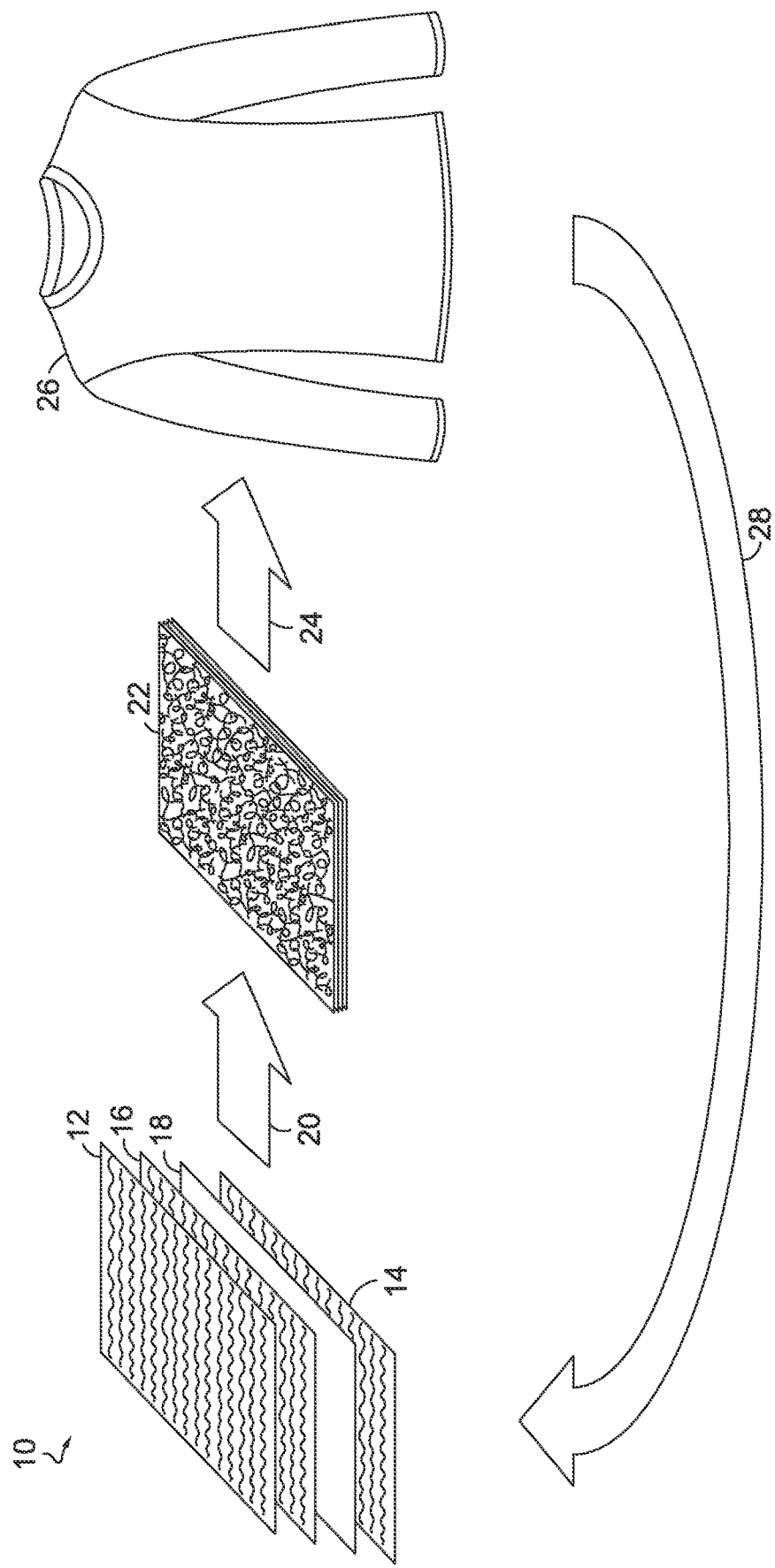
FIG. 1A illustrates an example lifecycle for an example composite textile, in accordance with examples.

Referring to FIG. 1A, FIG. 1A is a schematic depiction of an example lifecycle for a composite nonwoven textile contemplated herein. Reference numeral 10 generally indicates a first nonwoven layer 12, a second nonwoven layer 14, a third nonwoven layer 16, and an elastomeric layer 18 in a stacked configuration prior to entanglement. It is contemplated herein that, in some example aspects, one or more of the nonwoven layers may be optional. For instance, in some examples, a composite nonwoven can include only a first nonwoven layer 12 and a second material layer (e.g., the second nonwoven layer 14). One or more of the nonwoven layers can include a fiber web. In addition, the composite may include additional layers of material (e.g., one or more layers comprising thermoplastic polymer material).

In examples, the fibers used to form the first, second, and third nonwoven layers 12, 14, and 16 may include recycled fibers. Additionally, the elastomeric layer 18, in example aspects, may be formed of a material that is recyclable. Arrow 20 schematically represents an entanglement step where the fibers in the first nonwoven layer 12, the second nonwoven layer 14, and the third nonwoven layer 16 are entangled with each other such that one or more of the fibers extend through the elastomeric layer 18 to form a cohesive composite nonwoven textile 22. Arrow 24 schematically represents a processing step where the composite nonwoven textile 22 is formed into a wearable article 26. Although the wearable article 26 is shown as an upper-body garment, it is contemplated herein that the wearable article 26 may take other forms such as a lower-body garment, an upper of a shoe, a hat, gloves, sleeves, and the like.

At the end of the life of the wearable article 26, it is contemplated that a wearer may return the wearable article 26 to, for example, the manufacturer/retailor where the wearable article 26 may be partly or fully recycled as indicated by arrow 28 to form shredded fibers and/or re-extruded fibers that are used to form nonwoven textiles such as the nonwoven layers 12, 14, and 16 and potentially an elastomeric layer such as the elastomeric layer 18 thus creating a self-sustaining loop. In some examples, one or more of the shredded fibers and re-extruded fibers may be combined with virgin fibers (e.g., virgin polyester fibers) to form nonwoven textiles. This self-sustaining loop reduces the carbon impact typically associated with creating articles of apparel including knit, woven, and nonwoven articles of apparel. The lifecycle associated with FIG. 1A can include various other stages or elements that contribute to sustainability and reduced carbon impact.

Figure 1B:
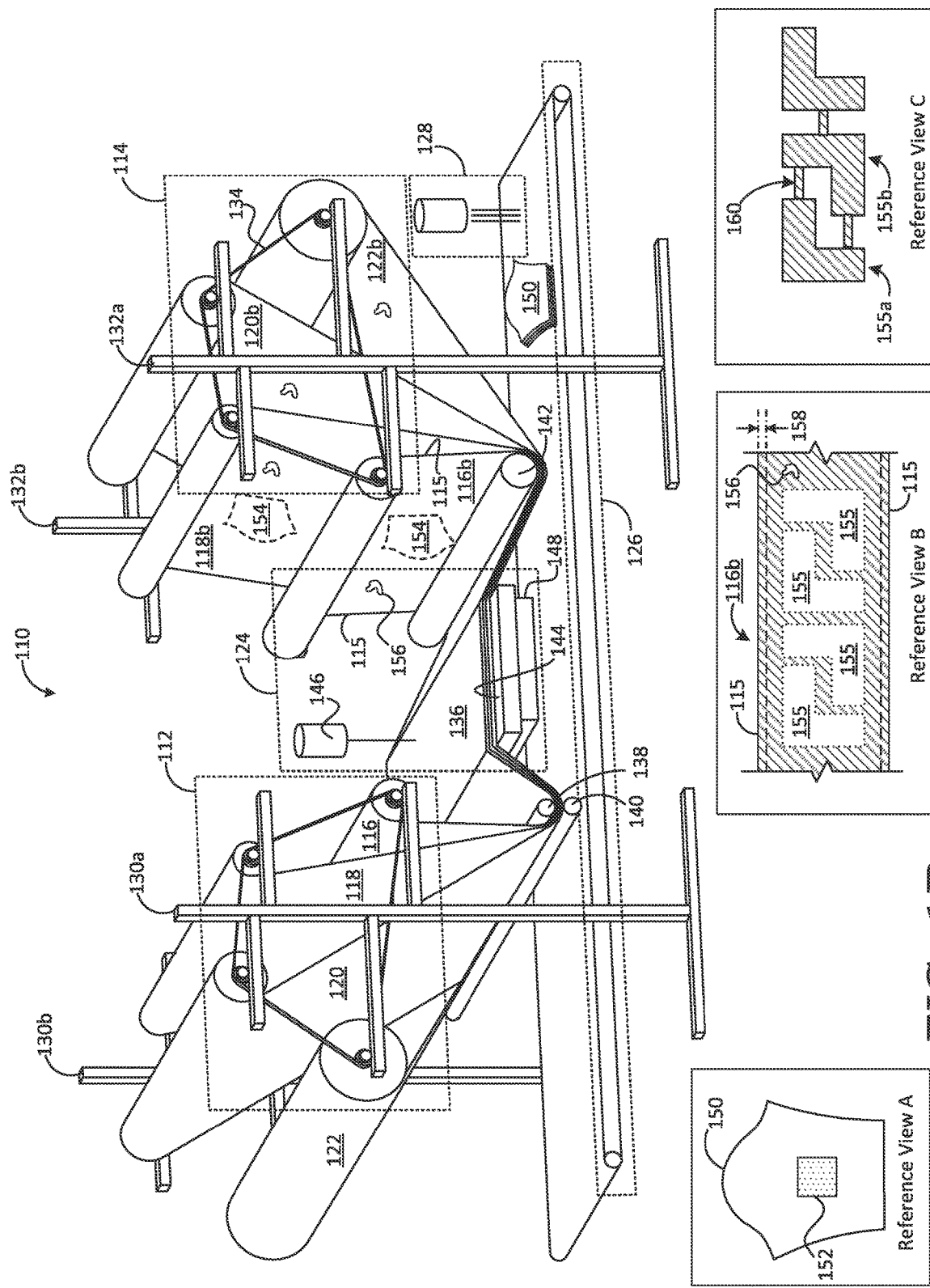
FIG. 1B illustrates an example system for constructing at least part of a composite textile, in accordance with examples of this disclosure.

FIG. 1B includes at least some examples associated with the present disclosure, and at a high level, FIG. 1B depicts a system 110 for constructing a composite textile (e.g., a composite textile for constructing the wearable article 26 in FIG. 1A). In some examples, the system 110 can construct a pattern piece (e.g., multi-layer pattern piece 150) for constructing at least a portion of a wearable article (e.g., the wearable article 26 in FIG. 1A). In addition, the system 110 can, in some instances, increase an ability to reuse remnants as part of the loop or life cycle described in association with FIG. 1A.

In examples, FIG. 1B includes a feeder assembly 112 that is configured to store and/or feed a textile to other parts of the system, as well as a collection assembly 114 to take up the textile, such as after it has been processed by other parts of the system 110. In addition, FIG. 1B includes a first textile 116, a second textile 118, a third textile 120, and/or a fourth textile 122 extending between the feeder assembly 112 and the collection assembly 114. The feeder assembly 112 can include fewer textiles (e.g., a single textile such as 116 or two textiles such as 116 and 118) and can include more textiles or different textiles (e.g., additional or different textiles as compared to 116, 118, 120, and 122).

In some examples, the system 110 can include a cutting assembly 124 that is positioned between the feed assembly 112 and the collection assembly 114 and that is configured to cut pattern pieces from the first textile 116, the second textile 118, the third textile 120, and the fourth textile 122. In addition, the system 110 can include a transport assembly 126 to transport pattern pieces cut from the first textile 116, the second textile 118, the third textile 120, and/or the fourth textile 122, as well as a preprocessing assembly 128 to preprocess pattern pieces prior to being incorporated into a wearable article or other finished good (e.g., bag).

FIG. 1B includes, according to an example, four textile layers. In some examples, the system 110 can be used with one or more textile layers. One or more of the textiles 116, 118, 120, and 122 can be omitted. In addition, one or textiles can be added to the system, in addition to the textiles 116, 118, 120, and 122.

In some examples, the system 110 can include fewer subassemblies, such that one or more of the subassemblies of FIG. 1B can be omitted.

In some examples, the system 110 can include different subassemblies, such that one or more of the subassemblies of FIG. 1B can be replaced. In some examples, the system 110 can include additional subassemblies, such that one or more of subassemblies can be added to those depicted in FIG. 1B.

Additional or different subassemblies can include a pick-and-place subassembly that places article pieces onto the staked layers.

Additional or different subassemblies can include fiber sprayers that deposit fibers (e.g., staple fibers, spunlace, spundbond, or meltblown) onto the stacked layers.

Additional or different subassemblies can include entanglement heads (e.g., needle or fluid) that can entangle fiber layers.

Additional or different subassemblies can include embroidery heads or sewing or stitching heads.

Additional or different subassemblies can include print heads, such as for depositing ink or other colorant, or 3D print heads for depositing material.

Additional or different subassemblies can include a laser head.

In some examples, the feeder assembly 112 can include one or more support structures 130a and 130b for rotatably supporting roll goods. For example, the support structure 130a and 130b can include a plurality of dowels (e.g., extending between the support structures 130a and 130b), posts (e.g., extending from each support structure, but not necessarily connecting the support structures 130a and 130b), or other core connectors that can insert into openings on the sides of roll good cores (e.g., hollow cores) or otherwise attach to the cores. In accordance with an example, FIG. 1B depicts four roll goods, which are associated with a respective one of the first textile 116, the second textile 118, the third textile 120, and the fourth textile 122.

The textiles can include a variety of different textiles. For example, at least one of the textiles 116, 118, 120, and 122 can include a nonwoven fiber web, such as a fiber web including entangled staple fibers. In some examples, at least one of the textiles 116, 118, 120, and 122 can include other types of nonwovens (e.g., spun-bonded, spunlace, meltblown, etc.). In some examples, at least one of the textiles 116, 118, 120, and 122 can include a woven textile. In some examples, at least one of the textiles 116, 118, 120, and 122 can include a knit textile. In some examples, at least one of the textiles 116, 118, 120, and 122 can include a film. In some examples, at least one of the textiles 116, 118, 120, and 122 can include a web or a scrim. In some examples, at least one of the textiles 116, 118, 120, and 122 can include a composite of multiple textiles. A composite of multiple textiles can include, in some instances, two or more textile layers that can be recycled together. For example, a bi-laminate composite can include a first non-woven layer comprising polyester fibers laminated with a TPEE film, in which the TPEE and polyester fibers can be recycled together. In some examples, at least one of the textiles 116, 118, 120, and 122 can include a carrier layer for supporting one or more other layers as they are collectively fed through the system 110.

As indicated one or more of the textiles 116, 118, 120, and 122 can include a fiber web, and the fiber webs can have at least partly different properties, which can be selected to achieve desired end properties for a multi-layer pattern piece 150. Stated differently, a first fiber web can include a first property, and a second material layer (e.g., second fiber web or a nonwoven textile formed by a different nonwoven process other than entangling stable fibers or knit textile or woven textile) can include a second property, which corresponds with the first property (e.g., is the same property type) and is different from the first property (e.g., has a different quality or quantity). Examples of properties can include at least one of chemical composition of fibers, average denier of fibers, average diameter of fibers, average length of fibers, surface coating applied to a respective web, and/or fiber color.

The properties of the textile 116 can be selected based in various criteria. For example, the properties can be based on the textile forming an outermost-facing surface or an innermost facing surface of a wearable article when the textile 116 is incorporated into the multi-layer pattern piece 150. In some examples, two or more of the textiles 116, 118, 120, and 122 can include respective fiber webs. In some examples, the fibers webs can be asymmetric (e.g., including one or more different properties. In some examples, the fibers webs can include the same properties. In examples, any of the textiles 116, 118, 120, and 122 can include any of the fibers described in this disclosure, including any of the materials (e.g., PET, polyamide, cotton, etc.); any shape; silicone-coated; monofilament; multi-component; virgin; recycled; shredded; re-pelletized; and the like.

In examples any of the textiles 116, 118, 120, and 122 can include various basis weights. For example, a basis weight can be from about 20 grams per square meter (gsm) to about 150 gsm, from about 35 gsm to about 65 gsm, from about 40 gsm to about 60 gsm, from about 45 gsm to about 55 gsm, or about 50 gsm.

In examples, any of the textiles 116, 118, 120, and 122 can include fibers having a staple length in range from about 20 mm to about 110 mm, from about 30 mm to about 65 mm, from about 40 mm to about 60 mm, from about 45 mm to about 55 mm, or about 51 mm. Fibers can comprise a uniform length such as when the fibers are formed from virgin extruded material (e.g., PET or polyamide) or re-extruded material (e.g., PET or polyamide) and cut to a defined length. In other aspects, the fibers can include a variation of staple length such as when the fibers are derived from a shredded fiber source. Any and all aspects, and any variation thereof, are contemplated as being within aspects herein.

In examples, any of the textiles 116, 118, 120, and 122 can include fibers having a denier of greater than or equal to about 1.0 D, or from about 1.2 D to about 3.5 D, from about 1.2 D to about 1.7 D, from about 1.3 D to about 1.6 D, or about 1.5 D. In addition, any of the textiles 116, 118, 120, and 122 can include fibers having a denier of less than or equal to about 1 D. For example, the denier may be about 0.1 D, about 0.2 D, about 0.3 D, about 0.4 D, about 0.5 D, about 0.6 D, about 0.7 D, about 0.8 D, or about 0.9 D.

In examples any of the textiles 116, 118, 120, and 122 can include fibers having at least one color property. The color property may be imparted to the fibers during, for example, the extrusion process when the fibers are being formed such that the fibers are dope dyed. In one example aspect, the color property may be white although other colors are contemplated herein.

In addition, any of the textiles 116, 118, 120, and 122 can comprise or be an elastomeric layer. In examples, the elastomeric layer can have a basis weight from about 20 gsm to about 150 gsm, from about 50 gsm to about 70 gsm, from about 55 gsm to about 65 gsm, or about 60 gsm.

Aspects herein contemplate forming the elastomeric layer from a thermoplastic polymer (e.g., thermoplastic elastomer), such as a thermoplastic polyurethane (TPU), a thermoplastic polyether ester elastomer (TPEE), combinations of TPU and TPEE, and the like. The elastomeric layer may include a spunbond layer, a meltblown layer, a film, a web, a scrim, and the like.

In addition, the elastomeric layer can comprise a TPEE spunbond layer or a TPU meltblown layer. In general, the elastomeric layer can be selected to provide desirable stretch and recovery properties and/or breathability to the multi-layer pattern piece 150.

In examples, the feeder assembly 112 can passively feed or pay out textile(s). For example, where the textiles are rotatably supported by the support structures 130a and 130b, the textiles can be paid out or extended by simply pulling on a free end of the textile, which can cause the textile roll goods to rotate on the support structures 130a and 130b.

In some examples, the feeder assembly 112 can actively feed or pay out textile. For example, one or more of the support structures 130a and 130b can include a rotatable crank or other mechanism that, when turned (e.g., manually or by a motor), also rotates the cores of the roll goods. In some examples, the support structures 130a and 130b can include a belt-driven mechanism that is attached to each of the cores and that, when operated, rotates multiple of the textile roll goods.

In some examples, the feeder assembly 112 can include alternative structures, which can be different, or in addition to, the support structures 130a and 130b. For example, the feeder assembly 112 can include upstream textiles processing equipment that forms the textiles. For example, if one of the textiles includes a fiber web, then the feeder assembly 112 can include a carder, lapper, and/or entanglement device or entanglement assembly (e.g., for lighter, pre-entanglement), such that the fiber web can be conveyed directly into the system 110 without being formed into a roll good. In another example, a textile can include other nonwovens, such as spunlace or spunbond, and the feeder assembly can include equipment for forming these nonwovens, such that the nonwovens can be conveyed directly into the system 110 without being formed into a roll good.

In at least some examples, one or more of the first textile 116, the second textile 118, the third textile 120, and the fourth textile 122 can include a homogeneous composition with respect to a given property. For example, one or more of the first textile 116, the second textile 118, the third textile 120, and the fourth textile 122 can include a nonwoven textile comprising a homogeneous composition of fibers, which can be determined based on a unit area having fibers with at least 90% of a measured property (e.g., fiber length, fiber denier, fiber diameter, color property, or chemical composition). In some examples, the nonwoven textile can include homogeneity of at least 95% of a measured property. In some examples, the nonwoven textile can include homogeneity of at least 98% of a measured property.

In some examples, the first textile 116, the second textile 118, the third textile 120, and/or the fourth textile 122 can extend between the feeder assembly 112 and the collection assembly 114. For example, the feeder assembly 112 can include a first set of one or more cores (e.g., one for each textile) and the collection assembly 114 can also include a second set of cores (e.g., one for each textile) rotatably supported on the support structures 132a and 132b. In addition, the first textile 116, the second textile 118, the third textile 120, and the fourth textile 122 can be unrolled from the feeder assembly 112 and attached to a respective core of the collection assembly 114.

In examples, the collection assembly 114 can actively take up textile. For example, the cores of the collection assembly can be manually rotated (e.g., cranked), which in turn can pull the textiles from the feeder assembly 112 and onto the cores of the collection assembly 114. In some examples, the collection assembly 114 can automatically take up a textile. For example, one or more of the support structures 132a and 132b can include at least one motor that rotates the cores and that, when operated, rotates multiple of the roll goods. In some examples, the drive mechanism can include a motor (not shown) that moves a belt 134 attached to the rotatable cores.

In some examples, one or more of the textiles 116, 118, 120, and 122 can extend in various manners between the feeder assembly 112 and the collection assembly 114. In at least some examples, segments of the textiles 116, 118, 120, and/or 122 that are unrolled between the feeder assembly 112 and the collection assembly 114 are stacked with one another to form a textile stack (e.g., 136 including unrolled segments or portions). Among other things, arranging the textiles 116, 118, 120, and/or 122 in a textile stack 136 can contribute the ability to simultaneously process multiple of two or more of the textiles 116, 118, 120, and 122. For example, in some instances, the textile stack 136 can be processed by the cutting assembly 124, which can simultaneously cut pattern pieces from two or more of the textiles 116, 118, 120, and 122.

In some examples, one or more of the textiles 116, 118, 120, and 122 can extend at least partially around one or more anchors (e.g., dowels, rollers, etc.) positioned between the feeder assembly 112 and the collection assembly 114. Among other things, the anchors can operate to change a direction in which the textile(s) extend, such as to direct the textile(s) into a particular processing area of the system 110. In addition, the anchors can create tension along the textile (s), which can reduce slack between the feeding assembly 112 and the collection assembly 114. In some examples, the anchors can provide a common anchoring point for directing the textiles 116, 118, 120, and 122 into the textile stack 136.

In some examples, the anchor(s) can include one or more rollers, such as the rollers 138, 140, and/or 142. For instance, the rollers 138 and 140 can compress the textiles 116, 118, 120, and/or 122 as they extend between the rollers 138, which can contribute to the textiles maintaining a stacked arrangement.

In addition, as described above, these rollers 138 and 140 can operate to change the direction in which the textiles extend and help to reduce slack. In some examples, the system 110 can omit the roller 140. In examples, the roller 142 can help to direct the flow of the textiles and reduce slack in another zone of the system 110, such as after a processing assembly positioned between the roller 138 and the roller 142. For example, the roller 142 can help direct the flow of the textiles and reduce slack prior to the textiles being taken up by the collection assembly 114.

In at least some examples, the rollers 138, 140, and 142 can increase the likelihood that the textiles 116, 118, 120, and 122 include a stacked arrangement with relatively minimal entanglement. For example, even though the textiles 116, 118, 120, and 122 can be layered face-to-face and directly face-abutting to one another, relatively minimal fiber or material transfer can occur between the various textiles.

The rollers 138, 140, and 142 can be supported in various manners. For instance, although not explicitly depicted in FIG. 1B, the rollers 138, 140, and/or 142 can be supported on the extensions or arms of the support structures 130a, 130b, 132a, and/or 132b. In some examples, the rollers 138, 140, and/or 142 can be affixed to other, additional support structures (e.g., support towers or stands not depicted in FIG. 1B).

The rollers 138, 140, and/or 142 can, in some instances, rotate or spin as the textiles move across the rollers 138, 140, and 142 (e.g., in a flow direction from the feeder assembly 112 to the collection assembly 114). In some examples, the rollers 138, 140 and 142 can remain stationary (e.g., not rotate or spin), and the textiles can slide across a convex surface of the roller.

As indicated, in some examples, two or more of the textiles 116, 118, 120, and 122 can be arranged in a textile stack 136, which can be further processed by assemblies of the system 110.

For example, the system 110 can include the cutting assembly 124. In some examples, the cutting assembly 124 can be arranged relative to the rollers 138, 140, and/or 142, which can help direct the flow of the textile stack 136 when the textile stack 136 is being fed into the cutting assembly 124 and is being collected from the cutting assembly 124.

In addition, the cutting assembly 124 can include a support surface 144 that is arranged relative to the rollers 138, 140, and/or 142 in a manner configured to increase the likelihood that that textiles remain relatively stacked and under tension. For example, the support surface 144 can include a relative height that is above the rollers 138 and 142, such that the textile stack 136 can be pulled relatively taut across the support surface 144 and with minimal slack.

In at least some examples, the cutting assembly 124 can include at least one cutting tool 146 arrange above the support surface 144, such that the textile stack 136 is between the cutting tool 146 and the support surface 144.

The cutting tool 146 can be configured to cut a pattern into the textile stack 136. For example, the cutting tool 146 can include computer numerical control (CNC) functionality. In some examples, the cutting tool 146 can include a blade, saw, knife (e.g., drag knife), router, laser (e.g., CO2 laser), and/or die, etc. In some examples, the cutting tool 146 can be suspended on a gantry and moveable in an x-y plane to follow a pattern, and movable in a z direction to adjust a depth of cut. In some examples, the cutting tool 146 can include a scanning laser.

In at least some examples, the cutting tool 146 can simultaneously cut multiple layers (e.g., all layers) of the textile stack 136 to generate a plurality of pattern pieces, each from a respective textile. In at least some examples, the cutting assembly 124 can include a vacuum 148 that can apply negatively pressurized air to the support surface 144. In some examples, the negatively pressurized air from the vacuum 148 can reduce the likelihood of the textile stack 136 shifting while being cut.

The system 110 can, in some instances, simultaneously cut multiple layers (e.g., all layers) of the textile stack 136 to generate a plurality of pattern pieces. In addition, after pattern pieces are cut in two or more of the textiles 116, 118, 120, and 120, the textiles 116, 118, 120, and 120 can include bordering or margin textile portions that are around the outside (beyond the perimeter edge of) the pattern pieces.

Examples of the present disclosure include separating the pattern pieces from the surrounding portions, which can generate remnant portions that are still attached to the collection assembly 114. For example, FIG. 1B depicts an example of a multi-layer pattern piece 150 that has been cut and separated from the textiles 116, 118, 120, and 122, and the remnants 116b, 118b, 120b and 122b remain attached to the collecting assembly 114.

In examples, the multi-layer pattern piece 150 can be separated from the remnants 116b, 118b, 120b, and 122b in various manners. For example, the multi-layer pattern piece 150 can fall (e.g., based on gravity) from the remnants 116b, 118b, 120b, and 122b. In some instances, pulling the textiles 116, 118, 120, and 122 across the roller 142 can urge or push the multi-layer pattern piece 150 from the remnants 116b, 118b, 120b, and 122b. In some examples, the roller 142 can be studded or include other protuberances that, when pressed into the textiles can cause the multi-layer pattern piece 150 to separate from the remnants 116b, 118b, 120b, and 122b.

In at least some examples, the multi-layer pattern piece 150 can be received by the transport assembly 126, which can be configured to transport the multi-layer pattern piece 150 to one or more other assemblies for processing. For example, the transport assembly 126 can include a conveyor that can position the multi-layer pattern piece 150 respective to the other assemblies. As described above, the multi-layer pattern piece 150 can include pattern pieces that are concurrently cut from the textile stack 136, and as such, the pattern pieces can include a same profile shape that is defined by the perimeter edge of the pattern pieces, and the perimeter edges of the pattern pieces can be aligned.

In at least some examples, the system 110 can include the preprocessing assembly 128 configured to prepare the multi-layer pattern piece 150 for incorporation into a finished good (e.g., wearable article, bag, etc.). For example, the preprocessing assembly 128 can include one or more components for affixing together the various pattern pieces of the multi-layer pattern piece 150. In some examples, the preprocessing assembly 128 can affix together a portion of the multi-layer pattern piece 150, such as a region of the multi-layer pattern piece 150 in the middle and smaller than the profile shape.

For example, in association with FIG. 1B, a reference view "A" depicts a plan view of the multi-layer pattern piece 150 and illustrates a portion 152 of the stacked pattern pieces that can be affixed by the preprocessing assembly 128. In some examples, the preprocessing assembly 128 can affix together at least most of the area formed by the profile shape of the multi-layer pattern piece 150 (e.g., more than the area 152). In at least some examples, affixing together at least a portion of the multi-layer pattern piece 150 increases the likelihood that the stacked pattern pieces will remain stacked and aligned for later processing. For example, the at least partially affixed multi-layer pattern piece 150 can be stably stored before subsequent processing, such as subsequent entanglement, thermal-bonding treatments, chemical surface treatments, embossing, debossing, printing, seaming, and the like.

The preprocessing assembly 128 can include various assemblies to affix together the multi-layer pattern piece 150 (e.g., affixing together at least the region 152). For example, the preprocessing assembly can include components for entangling fibers of at least a portion of the multi-layer pattern piece 150. In some examples, the preprocessing assembly 128 can include one or more needles for needlepunching together at least a portion of the multi-layer pattern piece 150. In some examples, the preprocessing assembly 128 can include one or more fluid jets (e.g., water jets) for fluid entangling (e.g., hydroentangling) at least a portion of the multi-layer pattern piece 150. In some examples, the preprocessing assembly 128 can thermally bond at least a portion of the multi-layer pattern piece 150. In some examples, the preprocessing assembly 128 can laminate at least a portion of the multi-layer pattern piece 150. In some examples, the preprocessing assembly 128 can chemically bond at least a portion of the multi-layer pattern piece 150.

In some examples, the preprocessing assembly 128 can include one or more needles for stitching together at least a portion of the multi-layer pattern piece 150. In some examples, the preprocessing assembly 128 can include one or more heads for welding (e.g., sonic welding) together a portion of the multi-layer pattern piece 150. In some examples, the preprocessing assembly 128 can include one or more heat sources (e.g., laser) for thermal bonding together at least a portion of the multi-layer pattern piece 150.

In some examples, the preprocessing assembly 128 can include one or more chemical-bonding sources for chemically bonding together (e.g., via an adhesive) at least a portion of the multi-layer pattern piece 150.

In some instances, the preprocessing assembly 128 operates to provide a connection that is stable, but not necessarily meant to be the only entanglement or connection before the multi-layer pattern piece 150 is incorporated into a finished good. As such, this lighter weight operation (e.g., as compared to a bi-directional multi-pass needling operation) can be easily implemented as a subassembly of the overall system 110 with tools (e.g., small, stationary needle punch or other tools) having a relatively small footprint.

In at least some examples, the preprocessing assembly 128 can include one or more various other assemblies for executing one or more various other operations associated with the multi-layer pattern piece 150. For example, the preprocessing assembly can include any of a pick-and-place subassembly that places elements onto the multi-layer pattern piece 150; fiber sprayers or depositers that deposit that deposit fibers (e.g., staple fibers, spunlace, spundbond, or meltblown) onto the multi-layer pattern piece 150; embroidery heads or sewing or stitching heads for adding stitching or other elements to the multi-layer pattern piece 150; and print heads, such as for depositing ink or other colorant, or 3D print heads for depositing material onto the multi-layer pattern piece 150.

As mentioned above, in at least some examples, the multi-layer pattern piece 150 is separated from the one or more textiles 116, 118, 120, and 122 to leave the remnants 116*b*, 118*b*, 120*b*, and 122*b* connected to the collection assembly 114. For example, FIG. 1B includes the cutouts 154 associated with the portions of the textiles where the pattern pieces were located prior to separating out. In addition, Reference View B is provided in FIG. 1B and also includes a plan view of the remnant 116*b*, with the cutouts 155 (e.g., a different shape than the cutout 154 for example purposes). In examples, the remnants 120*b* and 122*b* can also include cutouts, which are obscured from view in FIG. 1B.

In examples, the collection assembly 114 includes the various cores spaced apart at distances configured to peel apart the textile remnants 116*b*, 118*b*, 120*b*, and 122*b* as they are pulled away (e.g., via the motorized belt 134 rotating the cores) from the roller 142 and towards the collection assembly 114. In contrast to conventional approaches, because the textile stack 136 includes minimal to no entanglement when unrolled between the feeding assembly 112 and the collection assembly 114, the system 110 can peel apart the one or more remnants 116*b*, 118*b*, 120*b*, and 122*b* with minimal material or fibers transferred between the layers. As such, in some examples, one or more of the remnants 116*b*, 118*b*, 120*b*, and 122*b* can include (after being separated) a homogeneous composition consistent with the respective textile. That is, as described above, one or more of the textiles 116, 118, 120, and 122 can include a textile having a set of fibers including at least about 90% of a measured property (e.g., fiber length, fiber denier, color property, material composition, etc.), and the corresponding remnant can also include a set of fibers including at least about 90% of a measured property.

In at least some examples, relatively minimal material transfer can occur between the textiles. For example even though the remnants 116*b* and 118*b* might not be entangled (or otherwise affixed together), at least some material 156 (e.g., fibers) from the textile 118/remnant 118*b* can transfer onto the remnant 116*b*. That is, the material 156 can include fibers from one textile (e.g., 118) that transfer (e.g., possibly loosely) onto another textile (e.g., the surface of 116), such as where the textile 118 includes a nonwoven fiber web and one or more staple fibers of the textile 118 loosely transfer onto the surface of the textile 116 (e.g., less entangled as compared to when the stable fibers are subjected to mechanical entanglement).

The material 156 can be different from the homogenous composition of the textile 116 (e.g., when as a roll good). For example, the material 156 can have a different chemical composition, color properties, fiber properties (e.g., denier, diameter, length, shape, etc.), and the like. However, in some examples, the quantity of the material 156 that is non-homogeneous is relatively low as compared to conventional approaches in which attempts are made to collect the remnant (e.g., after the textiles have been subjected to mechanical entanglement). As such, even though the remnant 116*b* can have a lower degree of homogeneity based on the transferred material 156, the remnant 116*b* can still include at least 90% of the measured property.

In examples, at least one of the remnants 116*b*, 118*b*, 120*b*, and 122*b* can be reused in various manners. For example, the textile 116 can include a fiber web and the remnant 116*b* can include a fiber-web remnant, which can include a homogenous set of fibers consistent the textile 116. As compared with other techniques in which separating the fiber-web remnant from other remnants (e.g., 118*b*) is more challenging (e.g., due to a higher degree of entanglement), the fiber-web remnant 116*b* of the subject disclosure can include (e.g., provide) a more pure source of the homogenous set of fibers (e.g., a higher percentage of the homogenous set of fibers) for subsequent use(s). Among other things, the more pure source of the homogenous set of fibers (e.g., more pure as compared with conventional approaches to remnant collection) can be cut again into additional pattern pieces, shredded, re-pelletized, etc.

Various factors can be considered when cutting patterns in the textile stack 136. For example, in some instances cuts can be executed to optimize use of the textile stack 136 to generate a number of multi-layer pattern pieces, which can include different shapes and sizes. The patterns can be rotated to ensure patterns fit (e.g., are nested) within the footprint of the textile stack 136.

In some examples, the pattern pieces can be spaced apart by a threshold distance configured to increase the likelihood that the remnant retains continuity. In some examples, the pattern pieces can be spaced apart by a distance in a range of between about 20 mm and about 3 mm. In some examples, the pattern pieces can be spaced apart by a distance in a range of between about 20 mm and about 3 mm. In some examples, the pattern pieces can be spaced apart by a distance of about 5 mm. In addition, the patterns can be spaced to increase the likelihood that a minimum margin (e.g., the part of the left over remnant) extends around the cutouts (e.g., 154 and 155).

For example, in some instances, the one or more cutouts (e.g., 154 and 155) can be spaced inward from the edges (e.g., 115) of the textiles in order to leave a minimum, uncut margin 158 along the edges. In at least some examples, the margin 158 can include a threshold width configured to increase the likelihood that the textile does not disconnect from the core of the collection assembly 114 when being collected. That is, in some instances, tension is applied to the textiles when being wound onto the core of the collection assembly 114 (e.g., by the roller 142 on one side and by the core of the collection assembly 114 on the other side), and the margin 158 can help retain the structural integrity of the remnant and decrease the likelihood of the remnant tearing.

Although Reference View B depicts the remnant 116*b*, the margin can be maintained with respect to the other remnants 118*b*, 120*b*, and 122*b*, based on the edges being aligned in the stack 136. In some examples, the margin can include a distance in a range of between about 30 mm and about 5 mm. In some examples, the margin can be about 10 mm. In some examples, the margin 158 can be larger than the spacing between pattern pieces.

In at least some examples of the present disclosure, one or more runners can be cut together with the cutouts (e.g., 154 and 155). That is, one or more cutout-to-cutout connectors can be cut into the stack 136, and the connectors can link (via the stacked layers) one cutout to another cutout. For example, referring to Reference View C (in FIG. 1B), a first cutout 155*a* can be linked to a second cutout 155*b* via a runner 160 that is cut from the stack 136 (e.g., as part of the same operations associated with cutting the cutouts 155*a* and 155*b*). In some examples, the runner 160 can contribute to transporting the multi-layer pattern pieces through subsequent processing operations (e.g., entanglement, chemical bonding, thermal bonding, surface treatments, printing, etc.), such as by helping to retain layers in position (e.g., spacing, orientation, etc.). In some examples, the runner 160 can help retain smaller, multi-layer pattern pieces in position as the pattern piece is transported (e.g., conveyed through the system). In some examples, the runner 160 can be removed from the multi-layer pattern pieces and recycled in a separate step.

In at least some example, the present disclosure can include various fiber webs and composite textiles at various stages associated with a finished good (e.g., a wearable article constructed with the multi-layer pattern piece 150) and associated with the construction of a finished good.

Figure 2A:
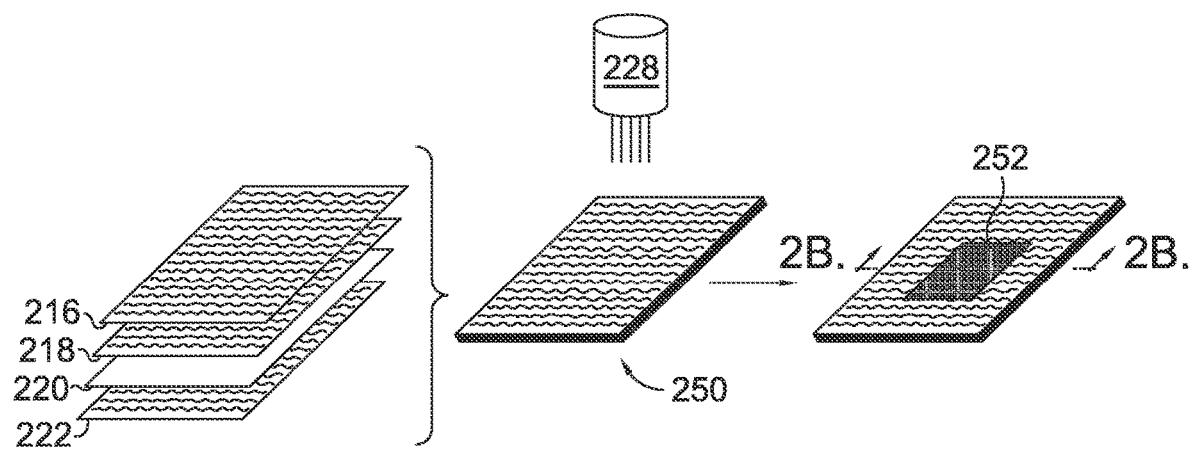
FIG. 2A illustrates operations for constructing a multi-layer pattern piece, in accordance with examples of this disclosure.

For example, referring to FIG. 2A, examples of the present disclosure include a multi-layer pattern piece 250 (e.g., which can be similar to the multi-layer pattern piece 150). The multi-layer pattern piece 250 includes a plurality of discrete pattern pieces 216, 218, 220, and 222 cut from a respective textile (e.g., as described with respect to the cutting assembly 124 and the multi-layer pattern piece 150). Any of the pattern pieces 216, 218, 220, and 222 can include any of the types of textile layers described with respect to FIG. 1B and the textiles 116, 118, 120, and/or 122. For example, any of the pattern pieces 216, 218, 220, and 222 can include a fiber web (e.g., any of the variety of different nonwoven fiber webs), a knit textile, a woven textile, a film, a web, a scrim, a composite, an elastomeric layer, a carrier layer, etc. In some examples, the multi-layer pattern piece 250 can include fewer layers (e.g., only two layers or only three layers) or can include additional layers.

The one or more discrete pattern pieces 216, 218, 220, and/or 222 include a perimeter edge that corresponds with the shape of the pattern cut by the cutting assembly (e.g., 124). For ease of description and illustration, the pattern pieces 216, 218, 220, and 222 are depicted as rectangular. In examples, the shapes of the pattern pieces 216, 218, 220, and/or 222 can correspond with any pattern for a pattern piece configured to construct a finished good. For example, the pattern piece can be associated with at least a portion of a wearable article (e.g., lower-body garment, upper-body garment, footwear upper, etc.). For instance, in association with an upper-body garment, the pattern piece can be associated with a sleeve, a front aspect, a back aspect, a shoulder, a yoke, a hood, etc. In association with a footwear article, the pattern piece can be associated with a medial side, lateral side, underfoot portion, vamp, instep, tongue, toe box, heel region, collar, etc.

In at least some examples, the pattern pieces 216, 218, 220, and/or 222 of the multi-layer pattern piece 250 are affixed together (e.g., by at least one component 228 of the preprocessing assembly, such as an entanglement device for mechanically entangling fibers via needling or water-jets, a laser, a heat press, etc.) in a region 252 that is less than the area associated with the shape of the pattern pieces 216, 218, 220, and/or 222.

Figure 2B:
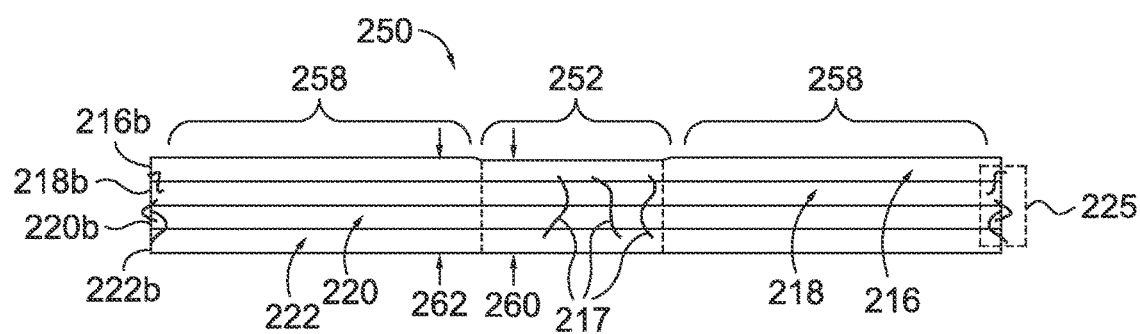
FIG. 2B illustrates a cross-sectional view based on FIG. 2A, in accordance with examples of this disclosure.

For example, the region 252 can be entangled (e.g., needle punched or fluid-entangled) or otherwise bonded or coupled, such that at least some fibers 217 (e.g., cross section in FIG. 2B) that were originally present in the pattern piece 216 at least partly are displaced from the pattern piece 216 and are pushed at least partly into one or more of the other pattern pieces 218, 220, and 222.

In some examples, the entanglement (or other coupling) in the region 252 is executed from only one side of the multi-layer pattern piece 250, and applied to one side of the multi-layer pattern piece 250 (e.g., needle entanglement is only performed to one face of the multi-layer pattern piece). In this respect, the entanglement applied to region 252 can include a lesser degree of needle entanglement, as compared to some conventional, multi-pass entanglement processes, and this lighter entanglement application can contribute to a more efficient and more sustainable (e.g., less energy) approach (e.g., as compared to a more complete, multi-face entanglement). In addition, this lighter weight entanglement step (e.g., as compared to a bi-directional multi-pass) can be easily implemented as a subassembly of the overall system 110 with a needle punch (e.g., 228) having a relatively small footprint.

The region 252 can include a higher percentage of the fibers 217 (e.g., as compared to other portions 258) that are displaced from the pattern piece 216. In some examples, the portions 258 of the pattern pieces 216, 218, 220, and/or 222 can be disconnected from adjacent faces and can be relatively free from connecting structures (e.g., fibers entangled between the pattern pieces).

Furthermore, in some examples, a thickness 260 of the multi-layer pattern piece 250 in the region 252 can be less than a thickness 262 associated with the other portions of the multi-layer pattern piece 250 (e.g., since those other portion 258 may not have been compressed on one side by the operations of the component 228 of the preprocessing assembly).

In at least some examples, other regions of the multi-layer pattern piece 250 can also be associated with at least some entanglement, which can include fibers that are more entangled than those in the portion 258. For example, the perimeter edges 216b, 218b, 220b, and 222b can also include at least some fibers from one layer entangled with at least some fibers of another layer (e.g., 225). Entanglement along the perimeter edges 216b, 218b, 220b, and 222b can arise, in some examples, from the cutting operation in which the pattern pieces 216, 218, 222, and 222 are simultaneously cut from the respective textiles. For example, where the cutting operation includes cutting the pattern pieces with a knife, blade, etc., then the cutting tool can mechanically entangle the fibers 225 when traversing along the pattern associated with the pattern piece.

In examples, the properties of the preprocessed, multi-layer pattern piece 250, with the affixed region 252, and/or in some examples the entangled edges, can impart various benefits. For example, the affixed region 252 with the entangled fibers 217 and the edge with the entangle fibers 225 can stabilize the multi-layer pattern piece 250 for further downstream processing. That is, in some examples, the system 110 can be associated with other systems that further process a larger portion of the multi-layer pattern piece (e.g., larger than the region 252), such as with additional mechanical entangling, surface treatment, chemical bonding, thermal bonding, embossing, debossing, etc. As such, the affixed region 252 and the one or more edges with entangled fibers 225 can increase the likelihood that the pattern pieces 216, 218, 220, and/or 222 remain affixed together as the multi-layer pattern piece 250 and that the perimeter edges of the pattern pieces 216, 218, 220, and/or 222 remain aligned. In some examples, maintaining alignment of the edges improves seaming operations (e.g., when attaching the multi-layer pattern piece 250 to another multi-layer pattern piece) by providing a cleaner edge for attachment and by creating a cleaner aesthetic (e.g., as compared to instances in which the edges can become less aligned before seaming).

In at least some examples, the region 252 includes a size and shape that is based on an arrangement of needles associated with the preprocessing assembly. In addition, the region 252 can be consistent among an array of different multi-layer pattern pieces. For example, the region 252 can be triangular, rectangular, circular, etc. and the substantially same shaped region can be applied across various pattern pieces, regardless of the pattern piece shape. Stated differently, among an array of pattern pieces (e.g., for different wearable articles), the same shaped region 252 can be formed in a sleeve pattern piece, a hood pattern piece, a front pattern piece, a back pattern piece, a footwear upper pattern piece, etc.

Figure 3:
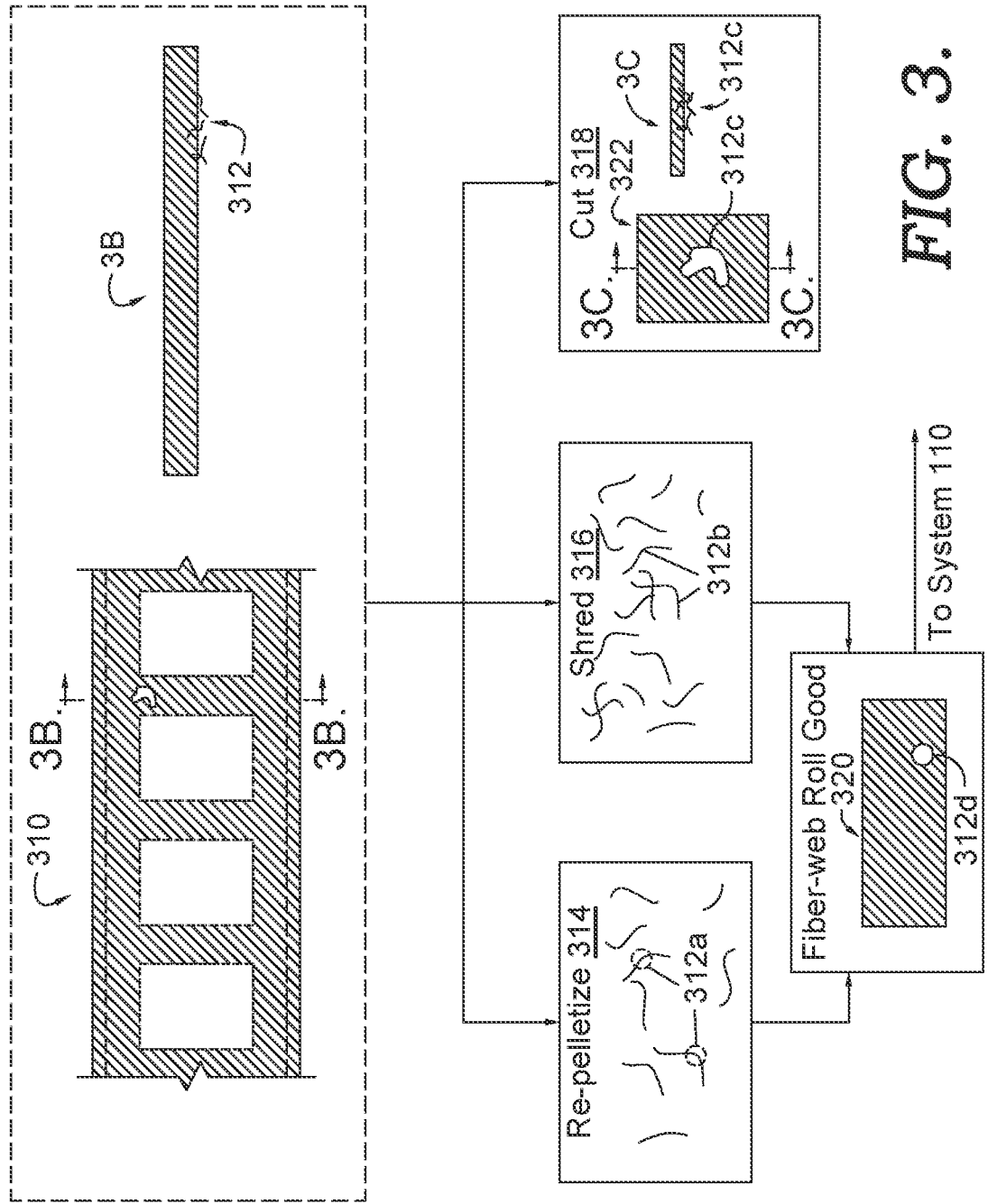
FIG. 3 illustrates a fiber-web remnant and operations associated with a fiber-web remnant, in accordance with examples of this disclosure.

Referring now to FIG. 3, additional examples associated with any of the remnants 116b, 118b, 120b, and 122b are described, and FIG. 3 depicts a remnant 310. For example, the remnant 310 can include a remnant after pattern pieces have been cut by the cutting assembly 124 of FIG. 1B. The remnant 310 can include a remnant that is wound onto a core. In addition, the remnant 310 can include a remnant that has been collected or gathered in other manners (e.g., not necessarily on a core), such as by folding or stacking. In at least some examples, the remnant 310 is configured to be reused to form other articles, such as by reusing fibers of the remnant 310, cutting additional pattern pieces from the remnant 310, shredding the remnant 310 to form shredded-article fibers, re-pelletizing fibers of the remnant 310 to generate recycled fibers (e.g., re-pelletized-polymer fibers), etc.

In at least some examples, any of the remnants can include a textile comprising a homogeneous set of fibers. For example, the homogeneous set of fibers can include a fiber web that has been carded, lapped, and possibly pre-needled (e.g., when formed into a fiber-web roll good), and that has not been entangled with the other textiles or that has only been minimally entangled with the other textiles. That is, as explained with respect to the system 110, the textiles 116, 118, 120, and/or 122 are not entangled or are only minimally entangled (e.g., by fibers loosely transferring onto a surface), such that the fibers associated with the remnant 310 are homogeneous, having little to no fibers or material from the other textiles after having been processed by the system 110.

In some examples, the remnant 310 can include the non-homogeneous material 312 (e.g., based on minimal transfer from other textiles when being processed by the system 110), and the remnant 310 can still include a threshold composition used to determine whether the set of fibers of the remnant are homogenous. In some examples, the threshold is at least about 90 percent homogeneity with respect to a given property. In some examples, the threshold is at least about 95 percent homogeneity with respect to a given property. For example, the non-homogeneous material 312 can include a different chemical composition, color properties, fiber properties, and the like. In some examples, the remnant 310 can include a homogeneous set of fibers comprising PET (e.g., virgin PET or recycled PET) and the non-homogenous material 312 can include TPU, TPEE, or some other thermoplastic polymer.

The remnant 310 can be reused in various manners. For example, the remnant 310 (or fibers from the remnant 310) can be re-pelletized 314, shredded 316, and/or cut 318 into additional pattern pieces. In some examples, re-pelletized and/or shredded fibers from the remnant can be mixed with virgin fibers to create a composite nonwoven textile. In at least some examples, the remnant 310 can be reused in these various manners, even with the non-homogeneous material 312, and the resulting product (e.g., fiber-web roll good 320, pattern piece 322, etc.) can still include at least about 90 percent homogeneity.

Further, in examples, the at least about 90 percent homogeneity (or some other threshold as appropriate based on a target quality) can be sufficient to allow the resulting textile or pattern piece to include a desired set of end properties, such as weight, thermal properties, stretch and recovery, good drape, an interesting visual aesthetic, good resistance to abrasion, and a soft hand, making the textile ideal for forming wearable articles.

For instance, when re-pelletized 314 (or pelletizing), a portion or segment 312a can include the non-homogeneous material, and the collection of re-pelletized-polymer fibers as a whole can still comprise at least about 90 percent homogeneity. In at least some examples, when shredded 316, at least some of the shredded fibers 312b can include non-homogeneous fibers, which are shredded by-products of the material 312, and the shredded fibers as a whole can still comprise at least 90 percent homogeneity.

Furthermore, any of the re-pelletized-polymer fibers or the shredded fibers can be processed into a fiber-web roll good 320 (e.g., by carding, lapping, and pre-needling), which can include the non-homogenous material 312d and still comprise at least about 90 percent homogeneity. In examples, the fiber-web roll good 320 can then be processed using the system 110. In at least some examples, a pattern piece 322 can be cut from the remnant 310, and the pattern piece 322 can include the non-homogeneous material 312c and also still include at least about 90 percent homogeneity.

Figure 4A:
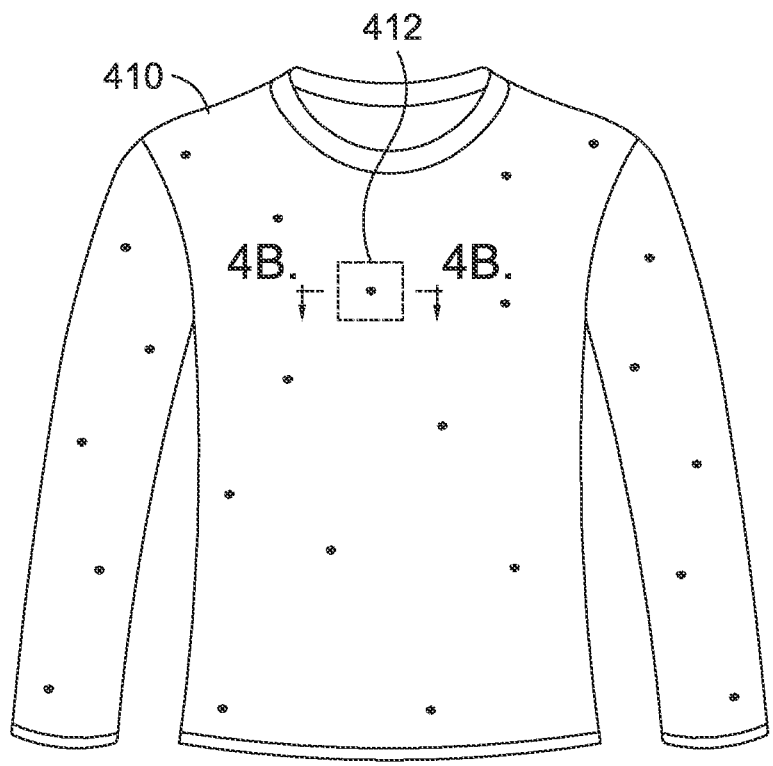
FIGS. 4A and 4B illustrate portions of a wearable article, in accordance with examples of this disclosure.
Figure 4B:
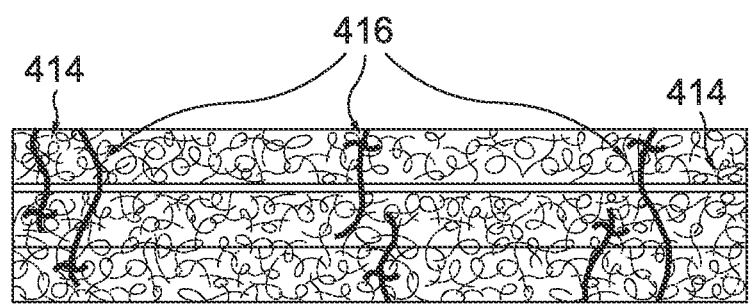

In at least some examples, the fiber-web roll good 320 or the pattern piece 322 can be used to form a wearable article, such as an upper-body garment, a lower-body garment, or a footwear upper. For example, referring to FIG. 4, a wearable article 410 is depicted, which can include at least a portion 412 constructed from one or more pattern pieces derived from the fiber-web roll good 320 or the pattern piece 322. In at least some examples, the wearable article 410 includes a composite textile, which can include the fiber web (e.g., fiber-web pattern piece cut from the fiber-web roll good 320 or the fiber-web pattern piece 322) mechanically entangled with one or more other textile layers (e.g., one or more other fiber webs and/or elastomeric material layers and/or any other textile layer described in this disclosure).

As such, the portion 412 of the wearable article 410 can include a fiber web that includes a first set of fibers 414 (e.g., FIG. 4B and represented by a thinner line weight) and a second set of fibers 416 (e.g., FIG. 4B and represented by a thicker line weight), which are non-homogeneous relative the first set of fibers 414 and comprises less than ten percent of the portion 412. In examples, despite the non-homogenous fibers 416, the portion 412 can still include a desired set of end properties, such as weight, thermal properties, stretch and recovery, good drape, an interesting visual aesthetic, good resistance to abrasion, and/or a soft hand, making the textile ideal for forming wearable articles. As such, articles, such as 410, that are associated with aspects of this disclosure can contribute to sustainability by still incorporating the by-products from the remnants (e.g., 310) in a finished good with desirable qualities.

At least some examples of the present disclosure are related to method for manufacturing a composite textile or an article containing a composite textile. For example, referring to FIG. 5, a flow diagram outlines steps that could be performed as part of a method 500 for manufacturing a composite textile. FIG. 5 also includes a set of pictorials that are provided as examples and to help illustrate steps, and the method is not limited to the subject matter depicted in those images.

The method 500 can include, at 502, stacking a fiber web adjacent to a material layer. For example, element 504 can represent a fiber web and element 506 can represent a material layer. The fiber web 504 can include, in some examples, a fiber-web roll good that has been carded, lapped, and pre-needled. The fiber web 504 can include, in some examples, other types of fiber webs in other nonwoven textiles.

The material layer 506 can also include a fiber web, such as a fiber-web roll good. In some examples, the element 504 is a first fiber web and the element 506 is a second fiber web. In addition, the first fiber web can include a first property, and the second fiber web can include a second property, which corresponds with the first property and is different from the first property. In examples, the first property and the second property can include at least one of chemical composition of fibers, average denier of fibers, average diameter of fibers, average length of fibers, surface coating applied to a respective web, and fiber color.

In some examples, the material layer 506 can include any other types of textile described in this disclosure (e.g., other nonwovens, knits, weaves/wovens, films, webs, scrims, elastomeric layers, etc.). In some examples, additional material layers (e.g., a third material layer such as another fiber web, an elastomeric layer, and/or any other type of material layer described in this disclosure) can also be stacked with the fiber web 504 and the material layer 506.

In examples, a third fiber web (not depicted) can include a third property, which corresponds with the first and second properties and is different from the first and second properties (e.g., at least one of chemical composition of fibers, average denier of fibers, average diameter of fibers, average length of fibers, surface coating applied to a respective web, and fiber color).

In some examples, the fiber web 504 and the material layer 506 can be stacked in association with operations of the system 110. For example, the fiber web 504 can include the textile 116 and the material layer can include the textile 118, and the fiber web 504 and the material layer 506 can include the textile stack 136. In some examples, the fiber web 504 and the material layer 506 can be stacked in association with operations other than the system 110. For example, the fiber web 504 and the material layer 506 can be segments of material layers (e.g., not necessarily being processed by the system 110) that are stacked one atop the other.

In at least some examples, the method 500 includes, at 508, cutting, in a shape associated with a pattern, the fiber web and the material layer. For example, the cut shape 510 associated with a pattern can be cut into the fiber web 504 and the material layer 506.

In FIG. 5, the pattern is a rectangle for example purposes, and the cut shape 510 could be any of a variety of different pattern pieces that could be used to construct a finished good, such as a wearable article. For example, the cut pattern 510 can include a portion of an upper-body garment, a portion of a lower-body garment, a portion of a footwear upper, or any other pattern pieces described in this disclosure.

In at least some examples, cutting can include cutting by the cutting assembly 124, such as via a knife or any other cutting tool 146 described in this disclosure. The cutting can be executed while the fiber web 504 and the material layer 506 are in a stacked arrangement, such that the fiber web 504 and the material layer 506 can be cut at the same time (concurrently or simultaneously) via the same cutting operation.

In at least some example, a result of the cutting (at 508) can include a first part and a remnant. For example, the first part can include a first delineated portion (e.g., corresponding with the shape 510) of the element 504 (e.g., a first fiber web) and a second delineated portion (e.g., also corresponding with the shape 510) of the element 506 (e.g., a second fiber web). In addition, the remnant can include a first remnant portion of the element 504 (e.g., first fiber web) and a second remnant portion of the second element 506 (e.g., second fiber web).

In addition, the method 500 can include, at 512, separating the fiber web into a fiber-web pattern piece, which comprises the shape associated with the pattern, and a fiber-web remnant. For example, the fiber web 504 can be separated into a fiber-web pattern piece 514 and a fiber-web remnant 516. In addition, at 518, the method 500 can include separating, concurrently with separating the fiber web, the material layer into a material-layer pattern piece, which comprises the shape associated with the pattern, and a material-layer remnant. For example, the material layer 506 can be separated into a material-layer pattern piece 520 and a material-layer remnant 522. In at least some examples, the pattern pieces can be separated from respective textiles via any of the strategies described in this description, such as manually removed, under gravity, via the roller 142, and the like.

The operations associated with 512 and 518 can be described in other ways. For example, the operations 512 and 518 can include separating a part from a remnant, where the part is a multi-layer part, which includes both a part (e.g., first delineated portion 514) cut from the element 504 and a part (e.g., second delineated portion 520) cut from the element 506, and the remnant is a multi-layer remnant including remnant portions (e.g., 516 and 522) of the elements 504 and 506.

In at least some examples, the pattern pieces 514 and 520 (e.g., respective delineated portions) can be entangled, such as by needle punching, fluid entanglement, etc. For example, the pattern pieces 514 and 520 can be entangled via the preprocessing assembly 128 or 228 (e.g., at least a portion of the pattern pieces 514 and 520).

In some examples, the pattern pieces 514 and 520 are entangled via a multi-pass needling operation, which can result in a greater degree of entanglement as compared with the operations associated with the preprocessing assembly 128 or 228. In at least some examples, after entanglement, the pattern pieces 514 and 520 (e.g., a multi-layer pattern piece) can be constructed into an article of apparel, such as a wearable article.

In at least some example, the method 500 includes, at 524, peeling the fiber-web remnant apart from the material-layer remnant. For example, the fiber-web remnant 516 can be separated from the material-layer remnant 522 using any of the techniques described herein. In some examples, the fiber-web remnant 516 and the material-layer remnant 520 are peeled part by the winding action of rotating cores of the collection assembly 114.

In some examples, the spacing of the cores and/or the minimal to no entangling between the fiber-web remnant 516 and the material-layer remnant 520 can improve the separability of the layers with minimal non-homogeneous material transferred to the fiber-web remnant 516. For example, in some examples, the fiber-web remnant 516 can include less than about 10% by weight of fibers from the element 506 or the remnant 522. As such, in some examples, the fiber-web remnant 516 is well suited to be reused in various manners (e.g., recycled, re-pelletized, shredded, cut, etc.).

In at least some examples, at least one of the remnant 516 and the remnant 522 is recycled. For example, recycling can include any of the operations described in this disclosure, such as those described with respect to FIG. 3. In some examples, recycling can include shredding a fiber-web remnant and using the shredded fibers to form another material layer (e.g., another fiber web or other non-woven material layer). For example, the shredded fiber can be carded, lapped, etc. to form a fiber web. In addition, the shredded fibers can be blended with non-shredded fibers (e.g., fibers that are extruded and cut but not shredded) to form a fiber web. The new material formed using shredded fibers can include, in some cases, greater variability in fiber length, due to fibers breaking during the shredding process. For example, in a fiber web comprising shredded fibers, the fibers can include a fiber length between 40 mm to 50 mm. In some examples, recycling can include pelletizing the fibers or re-pelletizing the fibers by transforming the fibers back to a pelletized form, which can then be extruded to from recycled fibers or used in some other manner suitable for the recycled material.

The operations in FIG. 5 can include one or more additional operations (not depicted) described in other portions of this disclosure. For example, the operations can include (e.g., with respect to the pattern pieces 514 and 520), placement of additional elements to be combined therewith, fiber deposition, printing, entanglement, stitching, and the like.

Example Clauses

Clause 1. A method comprising: stacking a fiber web adjacent to a material layer; cutting, in a shape associated with a pattern, the fiber web and the material layer; separating the fiber web into a fiber-web pattern piece, which comprises the shape associated with the pattern, and a fiber-web remnant; separating, concurrently with separating the fiber web, the material layer into a material-layer pattern piece, which comprises the shape associated with the pattern, and a material-layer remnant; and peeling the fiber-web remnant apart from the material-layer remnant.

Clause 2. The method of clause 1, wherein: the fiber web comprises a first material and the material layer comprises a second material, which is different from the first material; the method further comprises forming a second fiber web from fibers of the fiber-web remnant; and the second fiber web comprises an amount of the second material, which is less than a threshold amount, by weight, of the first material.

Clause 3. The method of clause 2, wherein the threshold amount is about 5%.

Clause 4. The method of clauses 2 or 3, wherein forming the second fiber web comprises repelletizing the fibers of the fiber-web remnant.

Clause 5. The method of any of clauses 2 through 4, wherein: forming the second fiber web comprises shredding the fiber-web remnant into shredded fibers; and forming the second fiber web with the shredded fibers.

Clause 6. The method of any of clauses 2 through 5, wherein the fiber web and the material layer are concurrently cut in the shape associated with the pattern.

Clause 7. The method of any of clauses 2 through 6 further comprising, after the fiber-web pattern piece and the material-layer pattern piece are separated from respective remnants, entangling fibers of the fiber-web pattern piece with the material-layer pattern piece.

Clause 8. The method of any of clauses 2 through 7 further comprising, entangling or bonding the fiber-web pattern piece and the material-layer pattern piece without entangling or bonding the respective remnants.

A textile or composite textile constructed using the method of any of clauses 1 through 8.

A roll good comprising remnant derived from the method of any of clauses 1 through 8.

Clause 9. A method comprising: extending an unrolled segment of a fiber web between a first rotatable core and a second rotatable core; stacking the unrolled segment of the fiber web adjacent to a material layer; cutting, in a shape associated with a pattern, the unrolled segment of the fiber web and the material layer; separating the fiber web into a fiber-web pattern piece, which comprises the shape associated with the pattern, and a fiber-web remnant; separating the material layer into a material-layer pattern piece, which comprises the shape associated with the pattern, and a material-layer remnant, wherein the fiber-web pattern piece and the material-layer pattern piece are stacked and comprise a multi-layer pattern piece; and winding the fiber-web remnant onto the second rotatable core.

Clause 10. The method of clause 9 further comprising: extending an unrolled segment of the material layer between a third rotatable core and a fourth rotatable core, wherein at least a portion of the unrolled segment of the material layer is stacked with the unrolled segment of the fiber web; and after cutting the material layer, winding the material-layer remnant onto the fourth rotatable core.

Clause 11. The method of clause 9 or clause 10, wherein: fibers of the fiber web compositionally comprise a first material and five percent or less, by basis weight, of a second material, and the material layer compositionally comprises the second material; and the method further comprises forming re-pelletized-polymer fibers from the fiber-web remnant, wherein the re-pelletized-polymer fibers compositionally comprise an amount of the first material and an amount of the second material, which is less than about five percent of the amount of the first material.

Clause 12. The method of any of clauses 9 through 11 further comprising:
shredding the fiber-web remnant into shredded fibers; and forming a second fiber web with the shredded fibers.

Clause 13. The method of any of clauses 9 through 12, wherein the fiber web and the material layer are concurrently cut in the shape associated with the pattern.

Clause 14. The method of any of clauses 9 through 13 further comprising, after the fiber-web pattern piece and the material-layer pattern piece are separated, entangling fibers of the fiber-web pattern piece with the material-layer pattern piece.

Clause 15. The method of any of clauses 9 through 14, wherein separating the fiber web comprises traversing the fiber web across a roller.

Clause 16. The method of any of clauses 9 through 15 further comprising, applying, while cutting the unrolled segment of the fiber web and the material layer, negatively pressurized air to the unrolled segment of the fiber web and the material layer.

A textile or composite textile constructed using the method of any of clauses 9 through 16.

A roll good comprising remnant derived from the method of any of clauses 9 through 16.

Clause 17. A system comprising: a fiber web extending between a first rotatable core and a second rotatable core; a material layer extending between a third rotatable core and a fourth rotatable core, wherein an unrolled portion of the fiber web is stacked with an unrolled portion of the material layer; a cutting tool that is positioned between the first rotatable core and the second rotatable core and that is configured to cut pattern pieces from the unrolled portion of the fiber web and the unrolled portion of the material layer; and a drive assembly configured to rotate the second core, which winds the fiber web after the pattern pieces are cut.

Clause 18. The system of clause 17 further comprising, one or more rollers positioned between the first rotatable core and the second rotatable core, wherein the unrolled portion of the fiber web and the unrolled portion of the material layer wrap at least partially around the one or more rollers.

Clause 19. The system of clause 17 or clause 18 further comprising a negative pressure source configured to apply negative pressure to the unrolled portion of the fiber web and the unrolled portion of the material layer.

Clause 20. The system of any of clauses 17 through 19, wherein the drive assembly is configured to rotate the fourth core, which winds the material layer after the pattern pieces are cut.

Clause 21. The system of any of clauses 17 through 20, wherein: a fiber-web pattern piece cut from the unrolled portion of the fiber web and a material-layer pattern piece cut from the unrolled portion of the material layer comprise a multi-layer pattern piece; and the system further comprises an entanglement device for mechanically entangling fibers of the fiber-web pattern piece with the multi-layer pattern piece.

Clause 22. The system of any of clauses 17 through 21, wherein the second core and the fourth core are spaced apart, such that winding the fiber web after the pattern pieces are cut peels the fiber web apart from the material layer.

A textile or composite textile constructed using the system of any of clauses 17 through 22.

A roll good comprising remnant derived from the system of any of clauses 17 through 22.

Clause 23. A method comprising: positioning a first fiber web on top of a second fiber web to form a stack, wherein: the first fiber web comprises a first property and the second fiber web comprises a second property, which corresponds with the first property and is different from the first property; and the first property and the second property include at least one of chemical composition of fibers, average denier of fibers, average diameter of fibers, average length of fibers, surface coating applied to a respective web, and fiber color; cutting the stack to form a first part and a remnant, wherein: the first part comprises a first delineated portion of the first fiber web and a second delineated portion of said second fiber web, and the remnant comprises a first remnant portion of the first fiber web and a second remnant portion of the second fiber web; separating the first part from the remnant; entangling the first delineated portion of the first fiber web with the second delineated portion of the second fiber web; removing the second remnant portion from the first remnant portion, wherein, after the removing, the first remnant portion comprises less than 10% by weight of fibers from the second remnant portion; and recycling at least one of the first remnant portion and the second remnant portion.

Clause 24. The method of clause 23, wherein the first fiber web is obtained from a first roll that is unwound and the second fiber web is obtained from a second roll that is unwound, the first fiber web being unwound on top of the second fiber web.

Clause 25. The method of clause 23 or clause 24 further comprising, cutting the stack to form at least a second part, wherein the second part comprises a third delineated portion of the first fiber web and a fourth delineated portion of the second fiber web.

Clause 26. The method of clause 25, wherein a first shape of the first part is different from a second shape of said second part.

Clause 27. The method of clause 25 or clause 26, wherein the first part and the second part are separated by a threshold distance.

Clause 28. The method of clause 27, wherein the first part and the second part are separated by a distance less than or equal to about 5 mm Clause 29. The method of any of clauses 25 through 28, wherein: the stack comprises a first longitudinal edge and a second longitudinal edge; and the first part and the second part are disposed inboard of the first longitudinal edge and the second longitudinal edge by a threshold.

Clause 30. The method of clause 29, wherein the threshold is at least about 10 mm.

Clause 31. The method of any of clauses 25 to 30, wherein: the stack comprises a first longitudinal edge and a second longitudinal edge; the first part and the second part are disposed inboard of the first longitudinal edge and the second longitudinal edge by a first distance; and the first part and the second part are separated from each other by a second distance, which is less than the first distance.

Clause 32. The method of any of clauses 23 through 31 further comprising, forming a third fiber web with the shredded fibers from the first remnant portion.

Clause 33. The method of clause 32, wherein said the third fiber web comprises a blend of the shredded fibers and non-shredded fibers.

Clause 34. The method of any of clauses 23 through 33, wherein: the second remnant portion comprises fibers that comprise a thermoplastic polymer; and the method further comprises, after removing the second remnant portion from the first remnant portion, pelletizing the fibers of the second remnant portion.

Clause 35. The method of any of clauses 23 through 34 further comprising, prior to cutting the stack, positioning a third material layer between the first fiber web and the second fiber wherein the third material layer comprises a third property, which corresponds with the first property and the second property and is different from the first property and the second property.

A textile or composite textile constructed using the method of any of clauses 23 through 35.

A roll good comprising remnant derived from the method of any of clauses 23 through 35.

Clause 36. A composite textile comprising a first textile layer comprising an entangled fiber web; a second textile layer mechanically entangled with the first textile layer; a first zone in a central region of the composite textile; a second zone comprising a margin along a terminal edge of the composite textile; and a third zone positioned between the first zone and the second zone, wherein the third zone is mechanically entangled less than the first zone, the second zone, or both the first zone and the third zone.

Clause 39. The composite textile of Clause 38, wherein the composite textile is constructed by the methods of any one or more of clauses 1 to 16 or 23 to 35; and/or wherein the composite textile is constructed using the system of any of clauses 17 to 22.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

This detailed description is provided in order to meet statutory requirements. However, this description is not intended to limit the scope of the invention described herein. Rather, the claimed subject matter may be embodied in different ways, to include different steps, different combinations of steps, different elements, and/or different combinations of elements, similar or equivalent to those described in this disclosure, and in conjunction with other present or future technologies. The examples herein are intended in all respects to be illustrative rather than restrictive. In this sense, alternative examples or implementations can become apparent to those of ordinary skill in the art to which the present subject matter pertains without departing from the scope hereof.

The invention claimed is:

1. A method comprising:
   stacking a fiber web adjacent to a material layer;
   cutting, in a shape associated with a pattern, the fiber web and the material layer;
   separating the fiber web into a fiber-web pattern piece, which comprises the shape associated with the pattern, and a fiber-web remnant;
   separating, concurrently with separating the fiber web, the material layer into a material-layer pattern piece, which comprises the shape associated with the pattern, and a material-layer remnant; and
   peeling the fiber-web remnant apart from the material-layer remnant.

2. The method of claim 1, wherein:
   the fiber web comprises a first material and the material layer comprises a second material, which is different from the first material;
   the method further comprises forming a second fiber web from fibers of the fiber-web remnant; and
   the second fiber web comprises an amount of the second material, which is less than a threshold amount, by weight, of the first material.

3. The method of claim 2, wherein the threshold amount is about 5%.

4. The method of claim 2, wherein forming the second fiber web comprises repelletizing the fibers of the fiber-web remnant.

5. The method of claim 2, wherein:
   forming the second fiber web comprises shredding the fiber-web remnant into shredded fibers; and
   forming the second fiber web with the shredded fibers.

6. The method of claim 1, wherein the fiber web and the material layer are concurrently cut in the shape associated with the pattern.

7. The method of claim 1 further comprising, after the fiber-web pattern piece and the material-layer pattern piece are separated from respective remnants, entangling fibers of the fiber-web pattern piece with the material-layer pattern piece.

8. The method of claim 1 further comprising, entangling or bonding the fiber-web pattern piece and the material-layer pattern piece without entangling or bonding the respective remnants.

9. A system comprising:
   a fiber web extending between a first rotatable core and a second rotatable core;
   a material layer extending between a third rotatable core and a fourth rotatable core, wherein an unrolled portion of the fiber web is stacked with an unrolled portion of the material layer;
   a cutting tool that is positioned between the first rotatable core and the second rotatable core and that is configured to cut pattern pieces from the unrolled portion of the fiber web and the unrolled portion of the material layer; and
   a drive assembly configured to rotate the second core, which winds the fiber web after the pattern pieces are cut.

10. The system of claim 9 further comprising, one or more rollers positioned between the first rotatable core and the second rotatable core, wherein the unrolled portion of the fiber web and the unrolled portion of the material layer wrap at least partially around the one or more rollers.

11. The system of claim 9 further comprising a negative pressure source configured to apply negative pressure to the unrolled portion of the fiber web and the unrolled portion of the material layer.

12. The system of claim 9, wherein the drive assembly is configured to rotate the fourth core, which winds the material layer after the pattern pieces are cut.

13. The system of claim 9, wherein:
a fiber-web pattern piece cut from the unrolled portion of the fiber web and a material-layer pattern piece cut from the unrolled portion of the material layer comprise a multi-layer pattern piece; and
the system further comprises an entanglement device for mechanically entangling fibers of the fiber-web pattern piece with the multi-layer pattern piece.

14. The system of claim 9, wherein the second core and the fourth core are spaced apart, such that winding the fiber web after the pattern pieces are cut peels the fiber web apart from the material layer.

15. A method comprising:
positioning a first fiber web on top of a second fiber web to form a stack, wherein:
the first fiber web comprises a first property and the second fiber web comprises a second property, which corresponds with the first property and is different from the first property; and
the first property and the second property include at least one of chemical composition of fibers, average denier of fibers, average diameter of fibers, average length of fibers, surface coating applied to a respective web, and fiber color;
cutting the stack to form a first part and a remnant, wherein:
the first part comprises a first delineated portion of the first fiber web and a second delineated portion of said second fiber web, and
the remnant comprises a first remnant portion of the first fiber web and a second remnant portion of the second fiber web;
separating the first part from the remnant;
entangling the first delineated portion of the first fiber web with the second delineated portion of the second fiber web;
removing the second remnant portion from the first remnant portion, wherein, after the removing, the first remnant portion comprises less than 10% by weight of fibers from the second remnant portion; and
recycling at least one of the first remnant portion and the second remnant portion.

16. The method of claim 15 further comprising, cutting the stack to form at least a second part, wherein the second part comprises a third delineated portion of the first fiber web and a fourth delineated portion of the second fiber web.

17. The method of claim 16, wherein a first shape of the first part is different from a second shape of said second part.

18. The method of claim 17, wherein:
the stack comprises a first longitudinal edge and a second longitudinal edge;
the first part and the second part are disposed inboard of at least the first longitudinal edge by a first distance; and
the first part and the second part are separated from each other by a second distance, which is less than the first distance.

19. The method of claim 18, wherein the first distance is at least about 10 mm.

20. The method of claim 15, wherein:
the second remnant portion comprises fibers that comprise a thermoplastic polymer; and
the method further comprises, after removing the second remnant portion from the first remnant portion, pelletizing the fibers of the second remnant portion.

* * * * *